United States Patent
Höglund et al.

(10) Patent No.: US 11,570,713 B2
(45) Date of Patent: Jan. 31, 2023

(54) METHODS AND APPARATUS RELATING TO PAGING IN A WIRELESS COMMUNICATIONS NETWORK

(71) Applicant: Telefonaktiebolaget LM Ericsson (publ), Stockholm (SE)

(72) Inventors: Andreas Höglund, Solna (SE); Martin van der Zee, Malmö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/401,433

(22) Filed: Aug. 13, 2021

(65) Prior Publication Data
US 2021/0377863 A1    Dec. 2, 2021

Related U.S. Application Data

(63) Continuation of application No. 16/084,675, filed as application No. PCT/SE2018/050770 on Jul. 17, 2018, now Pat. No. 11,129,100.
(Continued)

(51) Int. Cl.
*H04W 68/02*      (2009.01)
*H04W 52/02*      (2009.01)

(52) U.S. Cl.
CPC ... *H04W 52/0229* (2013.01); *H04W 52/0216* (2013.01); *H04W 68/02* (2013.01)

(58) Field of Classification Search
CPC ............. H04W 52/0229; H04W 68/02; H04W 52/0219; H04W 52/0216; H04W 76/27; H04L 1/08
See application file for complete search history.

(56) References Cited

U.S. PATENT DOCUMENTS

| | | |
|---|---|---|
| 2010/0087210 A1 | 4/2010 | Lee et al. |
| 2015/0131579 A1 | 5/2015 | Li et al. |

(Continued)

FOREIGN PATENT DOCUMENTS

| | | |
|---|---|---|
| CN | 105659676 A | 6/2016 |
| KR | 20080086045 A | 9/2008 |

(Continued)

OTHER PUBLICATIONS

"Considerations for loose paging occasion synchronism between eNBs", 3GPP TSG RAN WG2 Meeting #91bis, R2-154279, Sierra Wireless, Malmö, Sweden, Oct. 5-9, 2015, 5 pages.
(Continued)

*Primary Examiner* — Vinncelas Louis
(74) *Attorney, Agent, or Firm* — Murphy, Bilak & Homiller, PLLC

(57) ABSTRACT

According to embodiments described herein there is provided a wireless terminal device and a network node in a communications network. The wireless terminal device being operable in a plurality of modes comprising a first mode, in which the wireless terminal device is able to receive paging messages from the wireless communications network, and a second mode in which the wireless terminal device is unable to receive paging messages from the wireless communications network. The method in the wireless device comprising receiving a signal from a network node operable in the wireless communications network, wherein the signal comprises information related to the paging occasions; and responsive to a determination to that signal, operating in at least the second mode.

12 Claims, 14 Drawing Sheets

Related U.S. Application Data

(60) Provisional application No. 62/543,648, filed on Aug. 10, 2017.

(56) References Cited

U.S. PATENT DOCUMENTS

| | | | |
|---|---|---|---|
| 2015/0173039 A1* | 6/2015 | Rune | H04W 52/0216 370/311 |
| 2016/0270027 A1 | 9/2016 | Ang et al. | |
| 2016/0330791 A1 | 11/2016 | Vajapeyam et al. | |
| 2018/0176883 A1 | 6/2018 | Fujishiro et al. | |
| 2019/0239189 A1 | 8/2019 | Hwang et al. | |
| 2020/0029302 A1 | 1/2020 | Cox et al. | |

FOREIGN PATENT DOCUMENTS

| | | |
|---|---|---|
| WO | 2009152367 A1 | 12/2009 |
| WO | 2017026188 A1 | 2/2017 |

OTHER PUBLICATIONS

"eMTC power consumption reduction for paging and connected-mode DRX", 3GPP TSG-RAN WG2 #99, R2-1708285, Berlin, Germany, Aug. 21-25, 2017, pp. 1-8.

"NB-IoT power consumption reduction for paging and connected-mode DRX", 3GPP TSG-RAN WG2 #99, R2-1708284, Berlin, Germany, Aug. 21-25, 2017, pp. 1-8.

"Power consumption reduction for paging and connected-mode DRX for NB-IoT", 3GPP TSG-RAN WG1 #89, R1-1706887, Hangzhou, P.R. China, May 15-19, 2017, pp. 1-5.

* cited by examiner

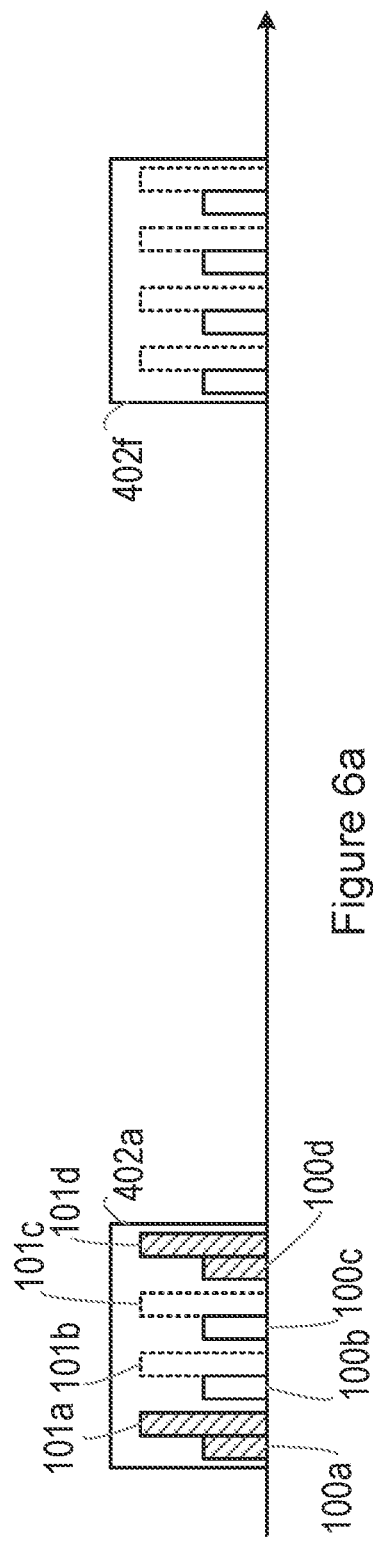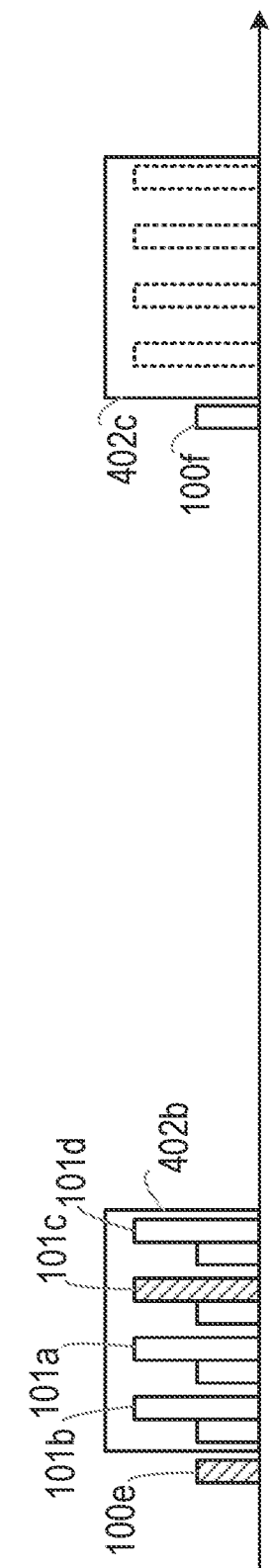

METHODS AND APPARATUS RELATING TO PAGING IN A WIRELESS COMMUNICATIONS NETWORK

RELATED APPLICATIONS

This application is a continuation of U.S. application Ser. No. 16/084,675 filed 13 Sep. 2018, which is a U.S. National Phase Application of PCT/SE2018/050770 filed 17 Jul. 2018, which claims benefit of Provisional Application No. 62/543,648 filed 10 Aug. 2017. The entire contents of each aforementioned application is incorporated herein by reference.

TECHNICAL FIELD

Embodiments of the present disclosure relate to methods and apparatus in a wireless communications network, and particularly to methods and apparatus for paging of a wireless terminal device in a wireless communications network.

BACKGROUND

Recently efforts have been made to specify technologies for use with Machine-to-Machine (M2M) and/or Internet of Things (IoT) related use cases. Suggested enhancements have included supporting Machine-Type Communications (MTC) with new UE categories (Cat-M1, Cat-M2), supporting reduced bandwidth of 6 physical resource blocks (PRBs) (up to 24 PRBs for Cat-M2), and Narrowband IoT (NB-IoT) UEs providing a new radio interface (and UE categories, Cat-NB1 and Cat-NB2).

There are multiple differences between "legacy" Long-Term Evolution (LTE) and the procedures and channels defined for enhanced MTC (eMTC) and for NB-IoT. Some important differences include new physical channels, such as the physical downlink control channels, called MPDCCH for eMTC and NPDCCH for NB-IoT, and a new physical random access channel, NPRACH, for NB-IoT.

Devices such as eMTC or NB-IoT devices may function in modes which reduce the power required. For example, in discontinuous reception mode (DRX), a de vice periodically wakes up to check for paging messages during paging occasions. In power saving mode (PSM), a device returns to idle mode, in which the device periodically checks for paging messages, after having transmitted an uplink message or a tracking area update (TAU).

FIG. 1 illustrates an example of DRX mode in a wireless terminal device.

The wireless terminal device monitors for a paging message during paging occasions 101 on the physical downlink control channel (PDCCH), such as MPDCCH for eMTC or NPDCCH for NB-IoT. Between the paging occasions, the wireless terminal device spends a window of time 103 in a sleep mode. During the DRX cycle, the wireless terminal device is, therefore, both able to receive paging messages during paging occasions and unable to receive paging messages (when it is in sleep mode). The paging occasions 101 are configured periodically with a period equal to the DRX cycle 104.

The wireless device may wake up slightly earlier than the paging occasion to obtain timing/frequency synchronization during a synchronization time window 100, and/or to reconfirm the identity of the serving cell. Once the wireless terminal device has the required timing and/or frequency information it goes on to monitor the PDCCH during the paging occasion 101. It there is no paging message, as is the case in FIG. 1, the wireless terminal device then goes back to sleep until it needs to wake-up to prepare for the next paging occasion.

The amount of time the wireless device is awake 102, therefore, includes a warm up time, the synchronization time window 100, the paging occasion 101 and the warm-down time.

The paging message sent over the PDCCH may contain several bits, and therefore the paging occasion 101 may span several 10 s of subframes.

SUMMARY

According to the present disclosure there is provided a method in a wireless terminal device for a wireless communications network, the wireless terminal device being operable in a plurality of modes comprising a first mode, in which the wireless terminal device is able to receive paging messages from the wireless communications network, and a second mode in which the wireless terminal device is unable to receive paging messages from the wireless communications network. The method comprises: receiving, during a first time window, a signal from a network node operable in the wireless communications network, wherein the signal comprises either: an indication that at least one of a plurality of paging occasions will be used for the transmission of paging information; or an indication that none of the plurality of paging occasions will be used for the transmission of paging information; wherein the plurality of paging occasions are defined for the purposes of receiving paging information from the wireless communications network during a second time window; and responsive to a determination that the signal comprises an indication that none of the plurality of paging occasions will be used for the transmission of paging information, operating in the second mode for the duration of the second time window.

According to another aspect there is provided a wireless terminal device in a wireless communications network, the wireless terminal device being operable in a plurality of modes comprising a first mode, in which the wireless terminal device is able to receive paging messages from the wireless communications network, and a second mode in which the wireless terminal device is unable to receive paging messages from the wireless communications network. The wireless terminal device comprises: a receiving module configured to receive, during a first time window, a signal from a network node operable in the wireless communications network, wherein the signal comprises either: an indication that at least one of a plurality of paging occasions will be used for the transmission of paging information; or an indication that none of the plurality of paging occasions will be used for the transmission of paging information; wherein the plurality of paging occasions are defined for the purposes of receiving paging information from the wireless communications network during a second time window; and a determination module configured to, responsive to a determination that the signal comprises an indication that none of the plurality of paging occasions will be used for the transmission of paging information, operate in the second mode for the duration of the second time window.

According to another aspect there is provided a method in a network node for a communications network operable to communicate with a wireless terminal device being operable in a plurality of modes comprising a first mode, in which the wireless terminal device is able to receive paging messages from the wireless communications network, and a second mode in which the wireless terminal device is unable to receive paging messages from the wireless communications network. The method comprises: determining whether any paging information is to be sent to the wireless terminal device in a second time window, wherein a plurality of paging occasions are defined for the purposes of receiving paging information from the wireless communications network during the second time window; and based on the determination, sending a signal during a first time window wherein the signal comprises either: an indication that at least one of a plurality of paging occasions will be used for the transmission of paging information; or an indication that none of the plurality of paging occasions will be used for the transmission of paging information.

According to another aspect there is provided a network node for a communications network operable to communicate with a wireless terminal device being operable in a plurality of modes comprising a first mode, in which the wireless terminal device is able to receive paging messages from the wireless communications network, and a second mode in which the wireless terminal device is unable to receive paging messages from the wireless communications network. The network node comprises: a determination module configured to determine whether any paging information is to be sent to the wireless terminal device in a second time window, wherein a plurality of paging occasions are defined for the purposes of receiving paging information from the wireless communications network during the second time window; and a transmitting module configured to, based on the determination, send a signal during a first time window wherein the signal comprises either: an indication that at least one of a plurality of paging occasions will be used for the transmission of paging information; or an indication that none of the plurality of paging occasions will be used for the transmission of paging information.

According to another aspect there is provided a method in a wireless terminal device for a wireless communications network, the wireless terminal device being operable in a plurality of modes comprising a first mode, in which the wireless terminal device is able to receive paging messages from the wireless communications network, and a second mode in which the wireless terminal device is unable to receive paging messages from the wireless communications network. The method comprises: determining whether to operate in the first mode or the second mode for a second time period based on whether any uplink messages are transmitted by the wireless terminal device during a first time period.

According to another aspect there is provided a wireless terminal device for a wireless communications network, the wireless terminal device being operable in a plurality of modes comprising a first mode, in which the wireless terminal device is able to receive paging messages from the wireless communications network, and a second mode in which the wireless terminal device is unable to receive paging messages from the wireless communications network. The wireless terminal device comprises: a determination module configured to determine whether to operate in the first mode or the second mode for a second time period based on whether any uplink messages are transmitted by the wireless terminal device during a first time period.

According to another aspect there is provided a method for a wireless terminal device in a wireless communications network, the wireless terminal device being operable in a plurality of modes comprising a first mode, in which the wireless terminal device is able to receive paging messages from the wireless communications network, and a second mode in which the wireless terminal device is unable to receive paging messages from the wireless communications network. The method comprises: establishing, during a first time w do an indication of whether to operate in the first mode or the second mode in a second time window and determining, based on the indication, whether to operate in the first mode or the second mode for the duration of the second time window, wherein the second time window spans a plurality of paging occasions.

According to another aspect there is provided a wireless terminal device in a wireless communications network, the wireless terminal device being operable in a plurality of modes comprising a first node, in which the wireless terminal device is able to receive paging messages from the wireless communications network and a second mode in which the wireless terminal device is unable to receive paging messages from the wireless communications network. The wireless terminal device comprises: an establishing module configured to establish, during a first time window, an indication of whether to operate in the first mode or the second mode in a second time window; and a determination module configured to determine, based on the indication, whether to operate in the first mode or the second mode for the duration of the second time window, wherein the second time window spans a plurality of paging occasions.

According to another aspect there is provided a wireless terminal device in a wireless communications network, the wireless terminal device being operable in a plurality of modes comprising a first mode, in which the wireless terminal device is able to receive paging messages from the wireless communications network, and a second mode in which the wireless terminal device is unable to receive paging messages from the wireless communications network. The wireless terminal device comprises: processing circuitry and a machine-readable medium storing instructions which, when executed by the processing circuitry, cause the terminal device to: receive, during a first time window, a signal from a network node operable in the wireless communications network, wherein the signal comprises either: an indication that at least one of a plurality of paging occasions will be used for the transmission of paging information; or an indication that none of the plurality of paging occasions will be used for the transmission of paging information; wherein the plurality of paging occasions are defined for the purposes of receiving paging information from the wireless communications network during a second time window; and responsive to a determination that the signal comprises an indication that none of the plurality of paging occasions will be used for the transmission of paging information, operate in the second mode for the duration of the second time window.

According to another aspect there is provided a network node for a communications network operable to communicate with a wireless terminal device being operable in a plurality of modes comprising a first mode, in which the wireless terminal device is able to receive paging messages from the wireless communications network, and a second mode in which the wireless terminal device is unable to receive paging messages from the wireless communications network. The network node comprises: processing circuitry and a machine-readable medium storing instructions which, when executed by the processing circuitry, cause the network node to:

determine whether any paging information is to be sent to the wireless terminal device in a second time window, wherein a plurality of paging occasions are defined for the purposes of receiving paging information from the wireless communications network during the second time window; and based on the determination, send a signal during a first time window wherein the signal comprises either: an indication that at least one of a plurality of paging occasions will be used for the transmission of paging information; or an indication that none of the plurality of paging occasions will be used for the transmission of paging information.

BRIEF DESCRIPTION OF THE DRAWINGS

For a better understanding of the present disclosure, and to show how may be put into effect, reference will now be made, by way of example, to the accompanying drawings, in which:

FIG. 6a illustrates an example of the operation of a wireless terminal device operating in eDRX mode;

FIG. 6b illustrates an example of the operation of a wireless terminal device operating in eDRX mode;

FIG. 6c illustrates an example of the operation of a wireless terminal device operating in eDRX mode;

DETAILED DESCRIPTION

Figure 1:
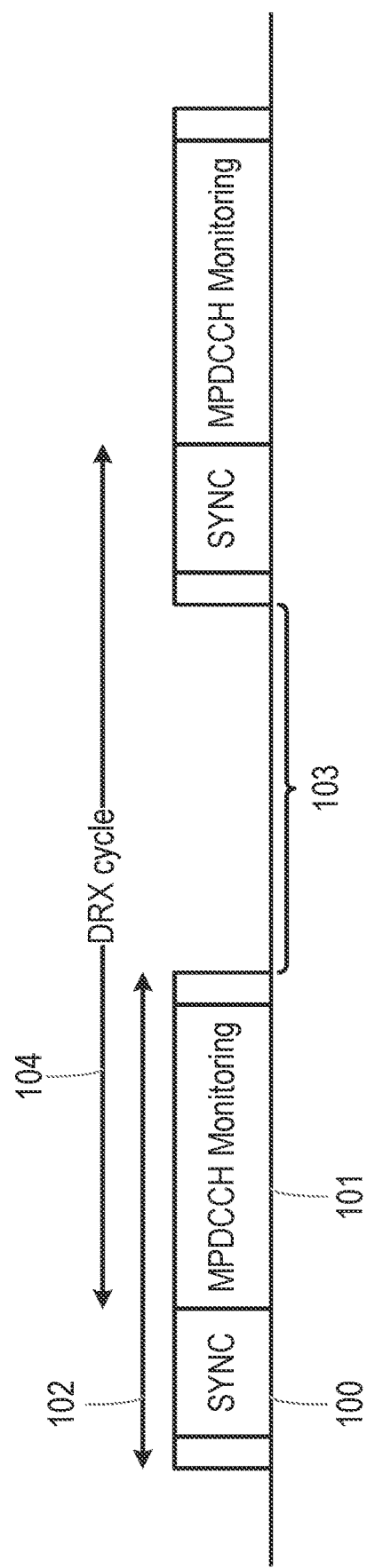
FIG. 1 illustrates an example of DRX mode in a wireless device.

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general-purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for a wireless terminal device, or user equipment (UE), it should be understood by the skilled in the art that "UE" is a non-limiting term comprising any mobile or wireless device, terminal or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the terms "mobile station" ("MS"), "mobile device", "terminal device" and "wireless terminal device" may be used interchangeably in the following description, and it will be appreciated that such a device does not necessarily have to be 'mobile' in the sense that it is carried by a user. Examples of UE are target device, device to device (D2D)

UE, machine type UE or UE capable of machine to machine (M2M) communication, PDA, tablet computer, mobile terminals, smart phone, laptop embedded equipped (LEE), laptop mounted equipment (LME), USB dongles, ProSe UE, V2V UE, V2X UE, MTC UE, eMTC UE, FeMTC UE, UE Cat 0, UE Cat M1, narrowband Internet of Things (NB-IoT) UE, UE Cat NB1, etc.

In some embodiments, a more general term "network node" is used and it can correspond to any type of radio access node or any network node, which communicates with a UE and/or with another network node. Examples of network nodes are NodeB, MeNB, SeNB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, SON, positioning node (e.g. E-SMLC), MDT, test equipment, etc. Moreover, where the following description refers to steps taken in or by a network node or a radio access node, this also includes the possibility that some or all of the processing and/or decision making steps may be performed in a device that is physically separate from the radio antenna of the node, but is logically connected thereto. Thus, where processing and/or decision making is carried out "in the cloud", the relevant processing device is considered to be part of the node for these purposes.

The embodiments are described for LTE or LTE based systems such as machine-type communication (MTC), evolved MTC (eMTC), NB-IoT etc. As an example, MTC UE, eMTC UE, and NB-IoT UE also called UE category 0, UE category M1 and UE category NB1. However, the embodiments apply to any RAT or multi-RAT systems, where the UE receives and/or transmit signals (e.g. data) e.g. LTE FDD/TDD, WCDMA/HSPA, GSM/GERAN, Wi-Fi, WLAN, CDMA2000, 5G, NR, etc. It is recalled that 5G, the fifth generation of mobile telecommunications and wireless technology is not yet fully defined but in an advanced draft stage within 3GPP. It includes work on 5G New Radio (NR) Access Technology. LTE terminology is used in this disclosure in a forward looking sense, to include equivalent 5G entities or functionalities although a different term is specified in 5G. A general description of the agreements on 5G New Radio (NR) Access Technology so far is contained in most recent versions of the 3GPP 38-series Technical Reports.

Figure 2:
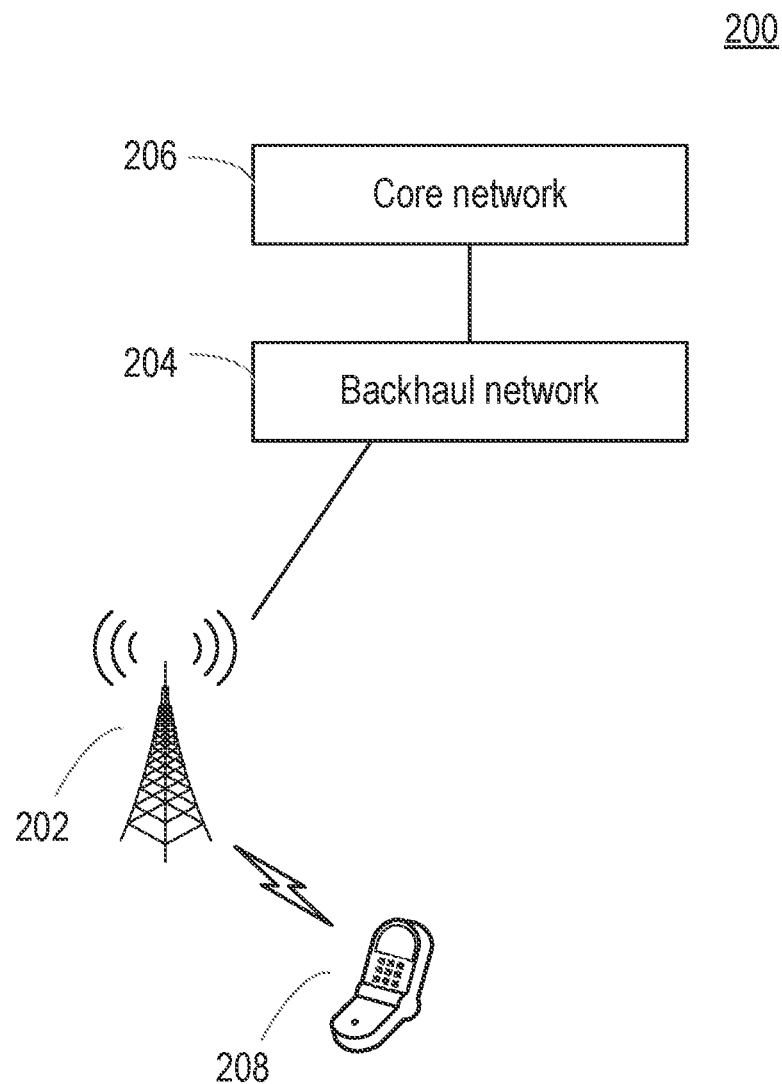
FIG. 2 illustrates a wireless communication network.

FIG. 2 illustrates a network 200 that may be utilized to explain the principles of embodiments of the present disclosure. The network 200 comprises a radio access node 202 which is connected, via a backhaul network 204, to a core network 206. FIG. 2 also shows a wireless terminal device (or UE, wireless terminal, etc) 208 that is in wireless communication with the radio access node 202. Although illustrated as a cellular or mobile phone, the wireless terminal device 208 may be any device which is able to communicate wirelessly with the network 202. In one particular embodiment, the wireless terminal device 202 is operable to communicate with the radio access node 208 using a narrowband radio access protocol, such as narrowband internet of things (NB-IoT). For example, the wireless terminal device 208 may be a machine-type communication (MTC) device.

Messages transmitted by the wireless terminal device 208 to the radio access node 202 are said to be transmitted in the "uplink", while messages transmitted by the radio access node 202 to the wireless terminal device 208 are said to be transmitted in the "downlink".

When operating in a mode such as DRX mode, the wireless terminal device may wake up periodically as described in FIG. 1 to receive paging information and paging messages from the radio access node 202. In some cases, no paging information is received, and the wireless terminal device can go back to sleep as illustrated in FIG. 1. If paging information is received, the terminal device may receive in the paging information an indication of the resources the wireless terminal device needs to monitor on the Physical Downlink Shared Channel (PDSCH) to receive a paging message.

Figure 3A:
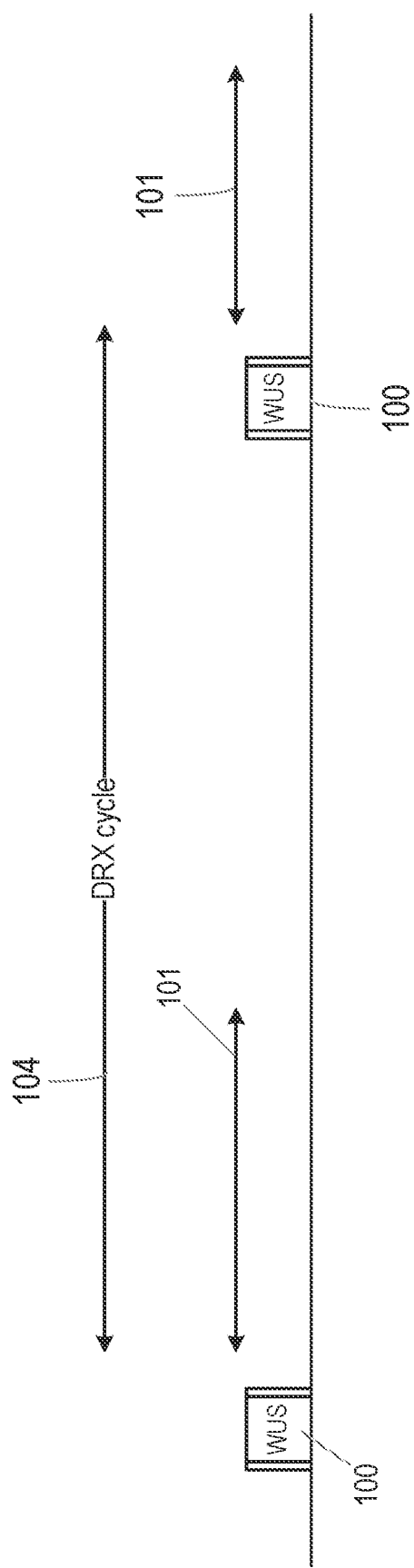
FIG. 3a illustrates example of DRX mode in a wireless device according to some embodiments.
Figure 3B:
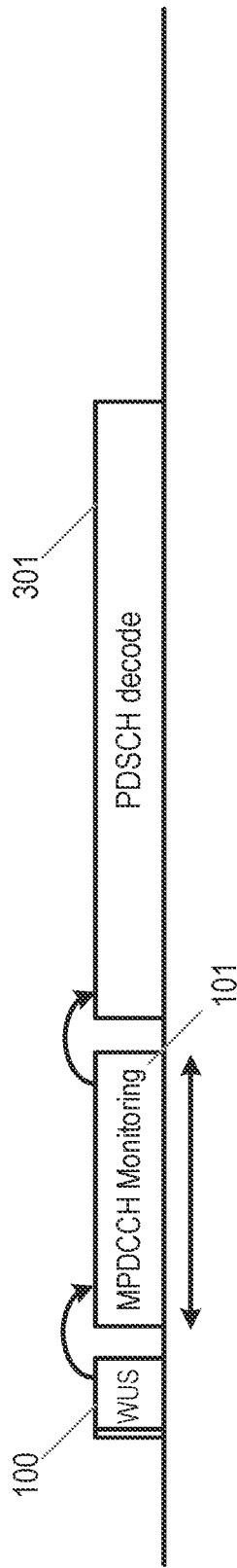
FIG. 3b illustrates example of DRX mode in a wireless device according to some embodiments.

In some examples, for example, as shown in FIGS. 3a and 3b, a Wake-up signal (WUS) or Go-to-Sleep (GTS) signal may be transmitted by a network node to indicate to a wireless terminal device whether or not paging information may be sent and received during a particular paging occasion. The WUS or GTS signal may be sent in a time window associated with a particular paging occasion.

For example, the presence of a WUS may indicate that paging information may be sent and received during a particular paging occasion. Alternatively, the additional signal may comprise a go-to-sleep signal (GSS), the presence of which indicates that no paging information may be sent and received during a particular paging occasion. In either case, the opposite scenario may be implicitly indicated by the absence of a signal in the time window. Thus, in the WUS implementation, the absence of a WUS may indicate that no paging information may be sent and received during a particular paging occasion; in the GSS implementation, the absence of a GSS may indicate that paging information may be sent and received during a particular paging occasion. In still further embodiments, both WUS and GSS may be transmitted to the wireless terminal device in different scenarios (i.e. the wireless terminal device may always receive a signal, whether it is WUS or GSS to indicate the respective presence or absence of paging information to be sent and received during a particular paging occasion).

The time window in which the WUS/GTS signal is to transmitted may be configured in order that the absence of a signal is to be detected and implicitly understood by the wireless terminal device. Such a configuration may take place via dedicated (e.g. RRC) or broadcast (e.g. system information (SI)) signalling from the network node.

For example, in some embodiments, the time window is configured immediately prior to a defined instance at which the wireless terminal device is to take to monitor the control channel (e.g. a paging occasion). In other embodiments, the time window may overlap partially or totally with the defined instance for monitoring the control channel. In that case, transmissions over the control channel may be stored temporarily until the WUS/GSS signal is decoded. If the signal indicates that no paging information may be sent and received during a particular paging occasion, the stored data can be discarded without being decoded.

In order to provide the savings in power consumption, the WUS/GSS signal may be easier to decode than transmissions over the control channel. For example, the WUS/GSS signal may comprise a sequence of a particular length or a symbol which is repeated certain number of times. When implemented as a repeated symbol, each symbol may comprise a single bit.

If the WUS or GTS indicates that no paging information will be sent during the following paging occasion, the wireless terminal device may not stay awake for the paging occasion as it is aware that no information is due to be received. Therefore, as shown in FIG. 3a, the wireless terminal device may wake up for the synchronization time window 100 to prepare for the following paging occasion. However, the wireless device may be configured such that if it receives no WUS or alternatively receives a GTS during the synchronization time window, the wireless terminal device may go into sleep mode during the paging occasion 101.

Alternatively, as shown in FIG. 3b, if a WUS is received or a GTS is not received during the synchronization time window 100, the wireless terminal device may be configured to stay awake for the paging occasion 101 as it is aware that some information will be received. The wireless terminal device may then monitor the PDCCH during the paging occasion 101 and may receive paging information indicating to the wireless terminal device the resources 301 of the Physical Downlink Shared Channel (PDSCH) it should monitor to receive the paging message.

By using a WUS or GTS comprising a small amount of resources, for example the WUS or GTS may be a 1-bit signal, the wireless terminal device can know in advance whether or not to monitor the PDCCH and thereby save power by not monitoring the PDCCH when it is not required.

Wireless terminal devices may also be operable in extended discontinuous reception mode (eDRX). In eDRX mode the wireless terminal enters into DRX mode (e.g. as described above with respect to FIG. 1) periodically for a period of time referred to as the paging time window (PTW) before entering into a sleep mode for a longer period of time. Within each PTW, the wireless terminal completes multiple (regular) DRX cycles, and therefore the PTW comprises multiple paging occasions.

In some examples, the maximum DRX cycle may be 10.24 seconds, in other words, the time between these starts of consecutive paging occasions may be a maximum of 10.24 seconds. By contrast, the maximum eDRX cycle may be 2 hours 54 minutes and 46 seconds, in other words the time between the starts of consecutive PTWs may be 2 hours 54 minutes and 46 seconds.

Figures 4A, 4B, 4C:
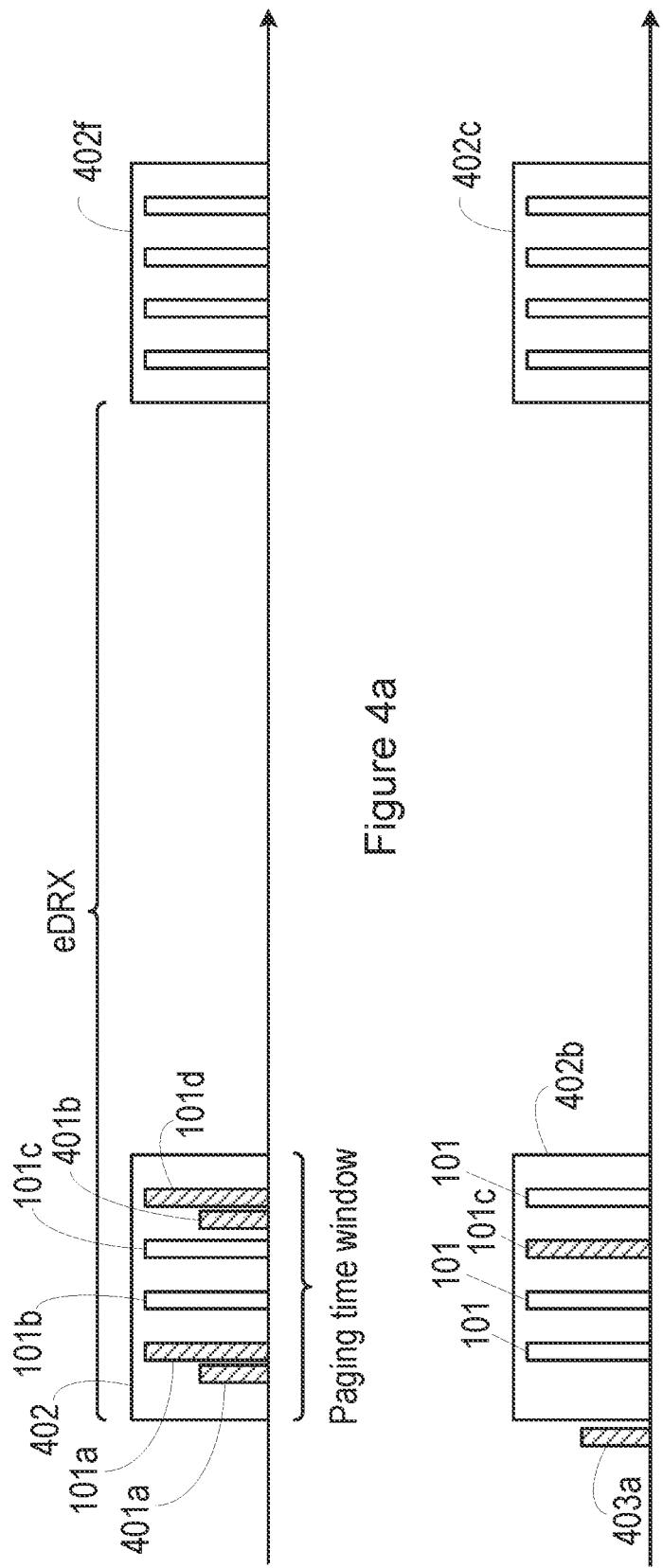
FIG. 4a illustrates an example of the operation of a network node communicating with a wireless terminal device operating in eDRX mode.
FIG. 4b illustrates an example of the operation of a network node communicating with a wireless terminal device operating in eDRX mode.
FIG. 4c illustrates an example of the operation of a network node communicating with wireless terminal device operating in eDRX mode.

FIGS. 4a to 4c illustrate various embodiments of the operation of a network node communicating with a wireless terminal device operating in eDRX mode. In these figures, the time periods for paging occasions 101 are represented by bars. If the bars are filled in, for example, bars 101a and 101d, the particular paging occasion is being used to transmit paging information. If the bars are not filled in, for example, bars 101b and 101c, the paging occasion is not being used to transmit paging information. WUSs 401 are represented by smaller filled in bars occurring prior to their respective paging occasions.

FIG. 4a illustrates the operation of a network node communicating with a wireless terminal device operating in eDRX mode.

In this example, a WUS/GTS 401a may be transmitted by the network node to the wireless terminal device prior to each paging occasion 101 in the PTW depending on whether there is paging information to be sent in the following paging occasion 101. In this example the signal 401a is a WUS. This allows the wireless terminal device to determine whether or not to wake up for the following paging occasion 101 in the PTW 402a. It will be appreciated that any signal comprising either: an indication that a paging occasion will be used for the transmission of paging information; or an indication that a paging occasion will not be used for the transmission of paging information, may be used as the WUS or GTS respectively.

Returning to FIG. 4a, in this example, a WUS 401a is sent before the paging occasion 101a and a WUS 401b is sent before the paging occasion 101d as paging information is to be sent during those paging occasions. No WUS is sent before the paging occasions 101b and 101c as no paging information is to be sent during those paging occasions. The skilled person will appreciate that alternatively a GTS could be sent before the paging occasions 101b and 101c and no GTS sent before the paging occasions 101a and 101d. Alternatively, a WUS may be sent before the paging occasions 101a and 101d and a GTS sent before the paging occasions 101b an 101c.

For the PTW 402f, as there are no paging occasions during which any paging information is to be sent, no WUS signals are sent for any of the paging occasions. Alternatively, a GTS may be sent before each paging occasion.

FIG. 4b illustrates the operation of a network node communicating with a wireless terminal device operating in eDRX mode according to a further example. In the embodiment of FIG. 4b, the network node transmits a WUS/GTS prior to the PTW, rather than prior to each paging occasion, in order to indicate whether or not any of the paging occasions within the paging time window will be used to transmit any paging information. If not, the wireless device may remain asleep for the duration of the PTW without having to wake up for each synchronization time window (i.e. to receive an individual WUS/GTS signal for each paging occasion) to determine whether to remain asleep for each individual paging occasion.

In this example, the network node sends a WUS 403a before the PTW 402b as paging information is transmitted during the paging occasion 101c during the PTW 402b.

In contrast, the network node does not send a WUS before the PTW 402c as no paging information is transmitted during any of the paging occasions in the PTW 402b.

In this example, a WUS or GTS can be used to indicate to the wireless terminal device whether any paging information will be transmitted during an entire PTW. This may reduce the power consumption of the wireless terminal device as it can remain asleep for an entire PTW if it is indicated that no paging information will be transmitted during the PTW.

In the example of FIG. 4c, the network node may transmit a WUS/GTS 401 for every paging occasion within the PTW as well as a WUS/GTS 403 associated with the PTW itself (i.e. indicating that at least one of the paging occasions contains paging information). In this embodiment, there is a trade-off between system overhead (i.e. how many WUS/GTS signals that are transmitted) and the wireless terminal device power consumption/robustness (i.e. the number of WUS/GTS the wireless terminal device is required to monitor). If system overhead is an important consideration, a WUS/GTS may be transmitted both before the PTW and before each paging occasion in the PTW as illustrated in FIG. 4c. In this case, wireless terminal devices that wake up in the same cell may, for example, be required to monitor only the WUS/GTS prior to the PTW in order to provide long battery life, whereas mobile wireless terminal devices waking up in a new cell may be required to monitor also WUS/GTS for each paging occasion in the PTW for increased robustness.

In some embodiments therefore, a mobile wireless terminal device may therefore omit monitoring for the remainder of a PTW if it detects a GTS, or does not detect a WUS, during the PTW.

In this example therefore, the network node transmits a WUS 403b before the PTW 402d as the PTW 402d contains paging information during at least one of the paging occasions occurring within the PTW 402d. The network node then does not transmit a WUS before the paging occasions 101a and 101b as no paging information is to be sent during those paging occasions. The network node however does send a WUS 401c and 401d before the paging occasions 101c and 101d as paging information is transmitted during those paging occasions.

The network node does not transmit a WUS before the PTW 402e as no paging information is to be sent in any of the paging occasions within the PTW 402e. The receiving wireless terminal device may therefore remain asleep for the duration of the PTW 402e.

This example, in contrast to the example of FIG. 4b, allows the wireless terminal device to remain asleep for longer periods of a PTW which contains only some paging occasions during which paging information is to be sent. This is because, for a PTW in which there is at least some paging information to be sent, the wireless terminal device need only wake for long enough to determine whether a WUS/GTS has been sent/not sent for a particular paging occasion, rather than having to wake up for each paging occasion as in FIG. 4b. However, this example may result in a slightly larger overhead than the example of FIG. 4b as a larger number of WUS/GTS signals may be required.

Figure 5:
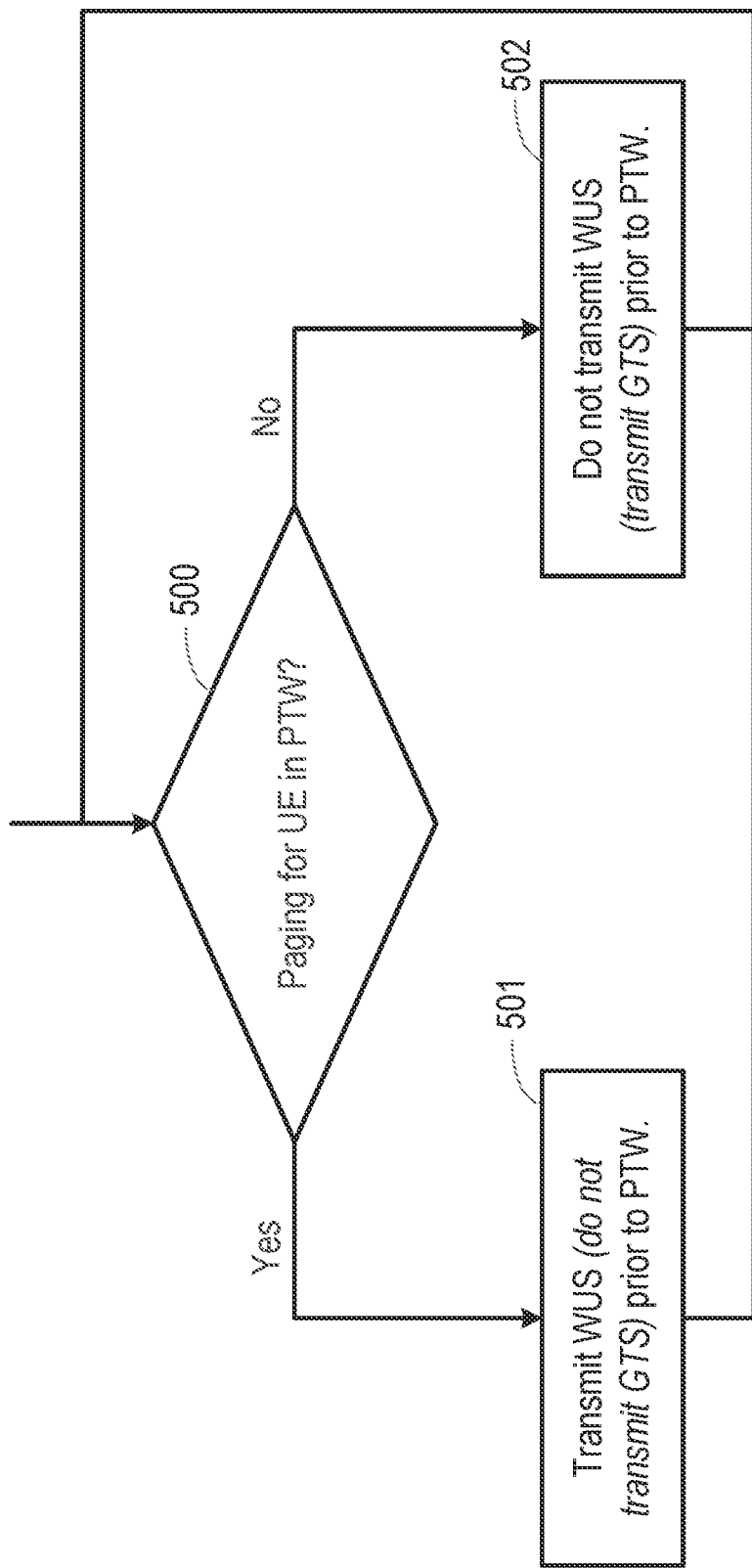
FIG. 5 illustrates a method in a network node operable to communicate with a wireless terminal device.

FIG. 5 illustrates a method in a network node for a communications network operable to communicate with a wireless terminal device being operable in a plurality of modes comprising a first mode, in which the wireless terminal device is able to receive paging messages from the wireless communications network, and a second mode in which the wireless terminal device is unable to receive paging messages from the wireless communications network. The second mode may comprise a sleep mode.

The method comprises determining whether any paging information is to be sent to the wireless terminal device in a second time window, wherein a plurality of paging occasions are defined for the purposes of receiving paging information from the wireless communications network during the second time window. The network node may then, based on the determination, send a signal during a first time window where the signal comprises either: an indication that at least one of a plurality of paging occasions will be used for the transmission of paging information; or an indication that none of the plurality of paging occasions will be used for the transmission of paging information. In some examples, the second time window is the PTW and the first time window is a synchronization time window prior to the PTW.

For example, the first time window may be a time window in which timing and/or frequency synchronization information is exchanged between the wireless terminal device and the wireless communications network. Such a time window may be associated with the second time window as a whole (i.e. in which the wireless terminal device synchronizes with the network node for the whole second time window), or with an individual paging occasion of the second time window (such as the initial paging occasion of the second time window).

For example, step 500 may comprise determining if any paging information is to be sent to the wireless terminal device in the PTW.

If no paging information is to be transmitted during the PTW the method passes to step 502.

In step 502 the method comprises not transmitting a WUS (or transmitting a GTS) to the wireless terminal device prior to the PTW.

If paging information is to be transmitted during the PTW, the method passes to step 501.

In step 501 the method comprises transmitting a WUS (or not transmitting a GTS) to the wireless terminal device prior to the PTW.

FIGS. 6a to 6c illustrate various embodiments of the operation of a wireless terminal device operating in eDRX mode. In these figures, the time periods for paging occasions 101 are represented by bars. If the bars are filled in, for example bars 101a and 101d in FIG. 6a, the particular paging occasion is being used to receive paging information. If the bars are not filled in, for example bars 101a and 101b in FIG. 6b, the paging occasion is not being used to transmit paging information but the wireless terminal device is awake during the paging occasion. If the bars are drawn with dotted lines, for example bars 101b and 101c in FIG. 6a, the paging occasion is not being used to transmit paging information and the wireless terminal device is in sleep mode during the paging occasion. Synchronization time windows 100 are represented by smaller bars prior to the paging occasions. If the synchronization time window bar is filled in, for example bar 100a in FIG. 6a, a WUS is received during the synchronization time window. If the synchronization time window bar is not filled in, for example bar 100b in FIG. 6a, no WUS is received during the synchronization time window. If there is no bar representing the synchronization time window, the wireless terminal device has remained in a sleep mode.

FIG. 6a illustrates the operation of a wireless terminal device operating in eDRX mode. In particular, this example shows the operation of a wireless terminal device operating in communication with a network node as described in FIG. 4a.

In this example, a WUS/GTS may be received from the network node by the wireless terminal device prior to each paging occasion in the PTW depending on whether there is paging information to be sent in the following paging occasion 101. In some examples, the WUS/GTS may be received during a synchronization time window 100. In this example, the signal is a wake up signal. This allows the wireless terminal device to determine whether or not to wake up for the following paging occasion 101 in the PTW 402a. It will be appreciated that any signal comprising either: an indication that at least one of a plurality of paging occasions will be used for the transmission of paging information; or an indication that none of the plurality of paging occasions will be used for the transmission of paging information, may be used as the WUS or GTS respectively.

Returning to FIG. 6a, in this example, a WUS is received during the synchronization time window 100a before the paging occasions 101a as paging information is to be received during that paging occasion. Similarly, a WUS is received during the synchronization time window 100d before the paging occasion 101d as paging information is to be received during that paging occasion. No WUS is received during the synchronization time windows 100b or 100c as no paging information is to be received during the paging occasions 101b and 101c. The skilled person will appreciate that alternatively a GTS could be received before the paging occasions 101b and 101c and no GTS received before the paging occasions 101*a* and 101*d*. Alternatively, a WUS may be received before the paging occasions 101*a* and 101*d* and a GTS received before the paging occasions 101*b* and 101*c*.

The wireless device does not, therefore, wake up for the paging occasions 101*b* and 101*c* as it is aware that it will receive no paging information during these paging occasions.

In this example, during the PTW 402*f*, the wireless terminal device wakes up for each synchronization time window during the PTW 402*f* and, as no WUS is received during each synchronization time window, the wireless terminal device returns to sleep mode for each paging occasion within the PTW 402*f*.

In FIG. 6*b*, the wireless device may receive a WUS/GTS prior to the PTW in order to determine whether or not any of the paging occasions within the paging time window contain any paging messages. If not, the wireless device may remain asleep for the duration of the PTW.

In some embodiments, a signal may be received in both instances, positively indicating whether any paging information is to be received in the following PTW. In other embodiments the wireless device may infer whether any paging information will be received from the lack of a particular signal. For example, if no WUS is received, a wireless terminal device may infer that it should operate in sleep mode for the duration of following PTW. For example, the network node may therefore be configured not to send a WUS, rather than explicitly to send a GTS, when there is no paging information to be sent during the PTW.

In this example, the wireless terminal device receives a WUS during the synchronization time window 100*e* before the PTW 402*b* as a paging indication occurs during the paging occasion 101*c* during the PTW 402*b*. The wireless terminal device will therefore wake up for every paging occasion during the PTW 402*b* as it is aware that it will receive paging information during at least one of the paging occasions.

In contrast, wireless device does not receive a WUS during the synchronization time window 100*f* before the PTW 402*c* as no paging information is received during any of the paging occasions in the PTW 402*c*. The wireless terminal device therefore remains in sleep mode for the duration of the PTW 402*c*.

In this example, a single WUS or GTS can be used to indicate to the wireless terminal device whether any paging indications will occur during an entire PTW. This may reduce the power consumption of the wireless terminal device as it can remain asleep for an entire PTW if it is indicated that no paging indications will occur. This is in contrast to FIG. 6*a* in which, even though no paging information was received during the PTW 402*f*, the wireless terminal device still woke up for every synchronization time window.

In the example of FIG. 6*c* the wireless terminal device may receive a WUS/GTS for every paging occasion within the PTW as well as a WUS/GTS 403 before any PTW containing any paging information. With this solution, there is a trade-off between system overhead (i.e. how many WUS/GTS signals that have to be transmitted) and the wireless terminal device power consumption/robustness (i.e. the number of WUS/GTS the wireless terminal device is required to monitor). If system overhead is not an important issue, a WUS/GTS may be received both before the PTW and before each paging occasion in the PTW as illustrated in FIG. 6*c*. In this case, wireless terminal devices that wake-up in the same cell may, for example, be required only to monitor the WUS/GTS prior to the PTW in order to provide long battery life, whereas mobile wireless terminal devices waking up in a new cell may be required to also monitor WUS/GTS for each paging occasion in the PTW for increased robustness.

In this example, therefore, the wireless device receives a WUS during the synchronization time window 100*g* before the PTW 402*d* as the PTW 402*d* contains paging information during at least one of the paging occasions occurring within the PTW 402*d*. The wireless device then does not receive a WUS during the synchronization time window 100*a* or the synchronization time window 100*b* before the paging occasions 101*a* and 101*b* as no paging information is to be received during those paging occasions. The wireless device, therefore, returns to sleep mode for the paging occasions 101*a* and 101*b*. The wireless device does, however, receive a WUS during the synchronization time windows 100*c* and 100*d* before the paging occasions 101*c* and 101*d* as paging information is received during those paging occasions.

The wireless terminal device does not receive a WUS during the synchronization time window 100*h* before the PTW 402*e* as no paging information is to be received in any of the paging occasions within the PTW 402*e*. The receiving wireless terminal device may therefore remain asleep for the duration of the PTW 402*e*.

This example, in contrast to the example of FIG. 6*b*, allows the wireless terminal device to remain asleep for longer periods of a PTW which contains only some paging occasions during which paging information is due to be sent. This is because, for a PTW in which at least one paging occasion is to be used, the wireless terminal device need only wake up for long enough to determine whether a WUS/GTS has been sent/not sent for a particular paging occasion, rather than having to wake up for each paging occasion as in FIG. 6*b*. However, this example may result in a slightly larger overhead than the example of FIG. 6*b* as a larger number of WUS/GTS signals may be required.

Figure 7:
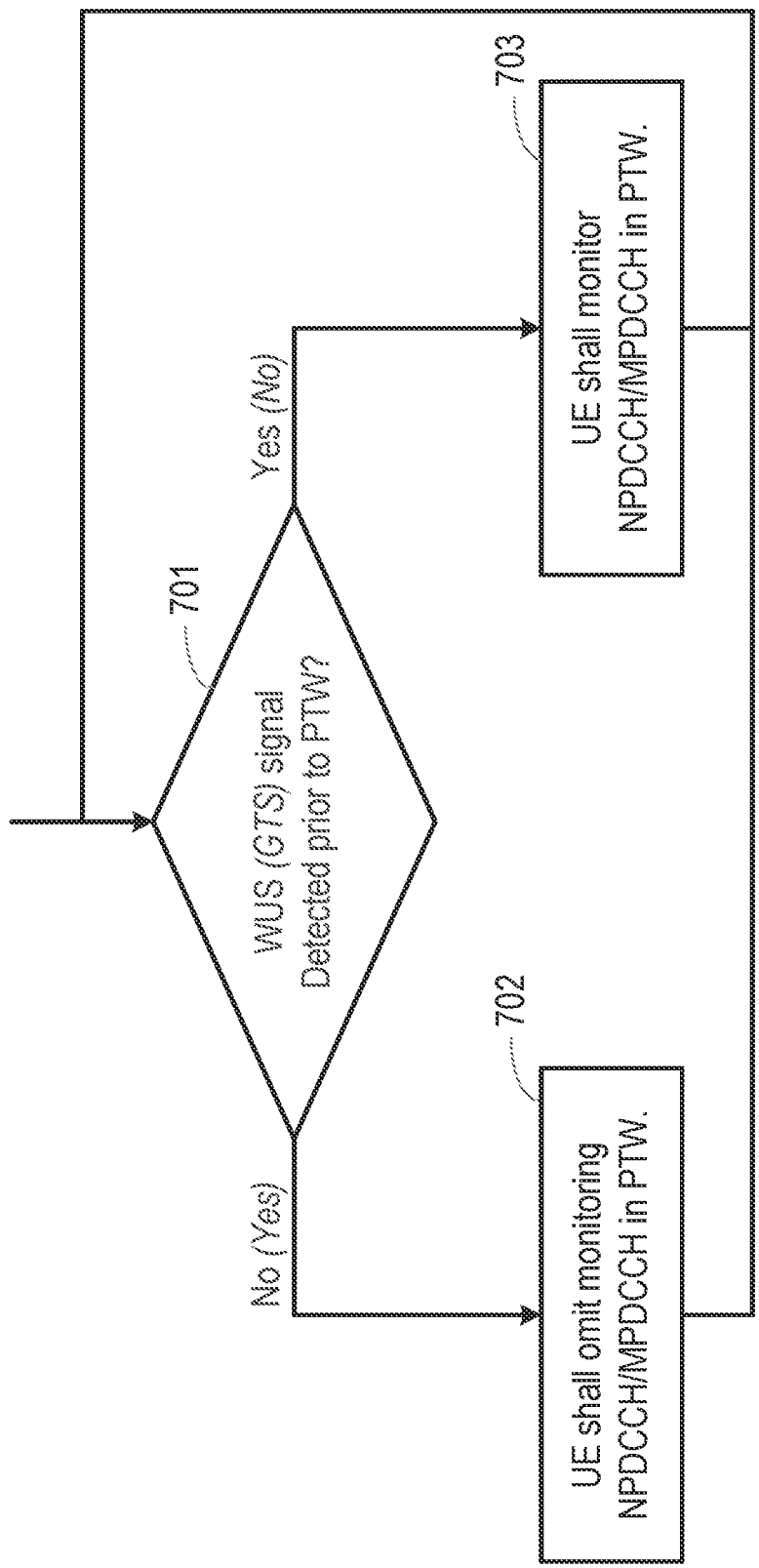
FIG. 7 illustrates a method in a wireless terminal device for a wireless communications network.

FIG. 7 illustrates a method in a wireless terminal device for a wireless communications network, the wireless terminal device being operable in a plurality of modes comprising an first mode, in which the wireless terminal device is able to receive paging messages from the wireless communications network, and a second mode in which the wireless terminal device is unable to receive paging messages from the wireless communications network. A plurality of paging occasions are defined for the purposes of receiving paging information from the wireless communications network during a second time window. In some embodiments the second time window is a PTW.

The method comprises receiving, during a first time window, a signal from a network node operable in the wireless communications network. The signal comprises either an indication that at least one of a plurality of paging occasions will be used for the transmission of paging information; or an indication that none of the plurality of paging occasions will be used for the transmission of paging information. In this example the signal is a GTS or a WUS. The first time window may be a synchronization time window in which timing and/or frequency synchronization information is exchanged between the wireless terminal device and the wireless communications network.

In some embodiments, when the signal comprises an indication that none of the plurality of paging occasions will be used for the transmission of paging information, for example a GTS signal, the method comprises, responsive to a determination that if the signal is received during the first time window, determining to operate in the sleep mode during the second time window. Alternatively, when the signal comprises an indication that at least one of a plurality of paging occasions will be used for the transmission of paging information, for example a WUS, the method comprises, responsive to a determination that the signal is not received during the first time window, determining to operate in the sleep mode for the duration of the second time window.

In step 701, the method may therefore comprise determining if a WUS (GTS) is detected prior to a PTW during a first time window.

If a WUS is not detected (or a GTS is detected) during the first time window the method passes to step 702 in which the wireless terminal device omits monitoring of the PDCCH during the paging time window. In other words, the wireless terminal device operates in a sleep mode for the duration of the second time window.

In some embodiments, when the signal comprises an indication that none of the plurality of paging occasions will be used for the transmission of paging information, for example a GTS signal, the method comprises, responsive to a determination that if the signal is not received during the first time window, determining to operate in the first mode during the second time window. Alternatively, when the signal comprises an indication that at least one of a plurality of paging occasions will be used for the transmission of paging information, for example a WUS, the method comprises, responsive to a determination that the signal is received during the first time window, determining to operate in the first mode during the second time window.

In the example of FIG. 7 therefore, if the WUS is detected (or the GTS is not detected) during the first time window the method passes to step 703 in which the wireless terminal device monitors the PDCCH during the paging time window. In other words, the wireless terminal device operates in the first mode during the second time window.

In an alternative to the embodiments described above, the second time window may be any other time period over which the wireless terminal device may omit monitoring NPDCCH/MPDCCH and paging information depending on a preceding WUS or GTS.

For example, in some embodiments to save resources needed to broadcast a WUS/GTS, the WUS/GTS could be broadcasted periodically, for example, every X seconds. The WUS/GTS may then refers to all the paging occasions following this WUS/GTS until the next WUS/GTS is transmitted (or not transmitted). If the wireless terminal device has a paging occasions within that time period, the WUS/GTS may then indicates whether the wireless terminal should wake-up or go-to-sleep. This may save resources for the network, however in these embodiments the wireless terminal device may wake up unnecessarily.

Such time period could for example be the System Frame Number (SFN) period, or a number of hyper-SFN (H-SFN) counts (i.e. a number of SFN periods). The SFN runs from 0 to 1023 every 10 ms i.e. 10.24 sec period. The H-SFN relates to a number of "SFN periods", i.e. 10.24 sec periods. For example, if the H-SFN also counts from 0 to 1023, one H-SFN period will last for 2.91 hours. Different H-SFN ranges may be defined for MTC and NB-IoT.

It will be appreciated that the signaling illustrated in FIGS. 4 to 7 may be applicable to other modes of operation, for example PSM. In the case of PSM, the first time window, which is the synchronization time window for eDRX, may be a time window comprising a Tracking Area Update (TAU) or an uplink data transmission time window. The second time window in the case of PSM may therefore be an Active Time following the first time window in which the wireless terminal device operates in a first mode, for example RRC_IDLE.

Power-saving mode (PSM) was introduced as a feature which can provide very long battery life for wireless devices with infrequent data exchange and no need for quick downlink reachability. PSM works by, for most of the time, keeping the wireless device in a power efficient sub-state to RRC_IDLE in which all Access Stratum functionality is switched off (almost power-off but no re-attach needed). After a connection, the wireless terminal device may switch to this power saving state after a certain time in RRC_IDLE mode, controlled by the configurable parameter active time (T3324). The wireless terminal device will then switch out of the power saving state either upon an uplink (UL) data transmission or for a periodic Tracking Area Update (TAU) controlled by a parameter T3412.

For power saving mode the above description of FIGS. 4-7 may be applied but with the first time window instead being a connected time window, for example a Tracking Area Update (TAU) or an uplink data transmission, and the second time window being the Active Time during which the wireless terminal device is usually in RRC_IDLE mode following being in RRC_CONNECTED mode.

Figure 8A:
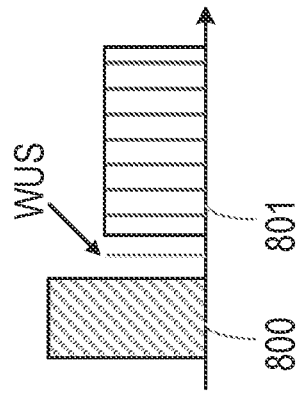
FIGS. 8a to 8c illustrate examples of the operation of a wireless terminal device capable of operating in power saving mode (PSM).
Figure 8B:
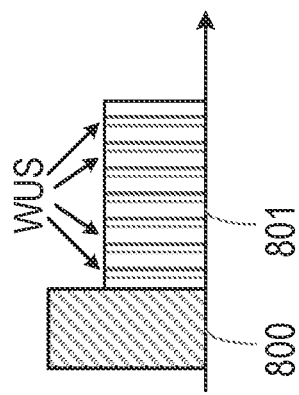
Figure 8C:
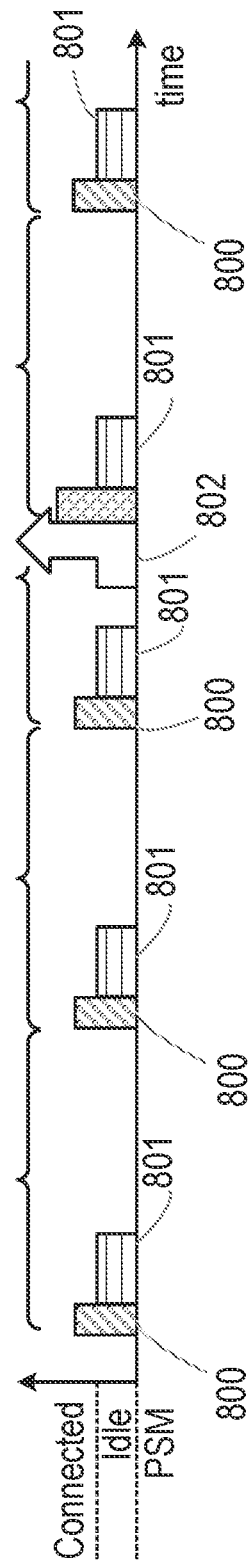

FIGS. 8a to 8c illustrate the operation of a wireless terminal device capable of operating in power saving mode (PSM).

For PSM, monitoring of paging information occurs in the Active Time 801 which follows either a Tracking Area Update (TAU) 800 or an uplink data transmission 802.

FIG. 8a illustrates an example of the operation of a wireless terminal device. In this example, the wireless terminal device receives a WUS/GTS before each paging occasion during the Active Time 801, similarly to as described with respect to FIG. 6a. However, to reduce power consumption it may be better if the wireless device can omit monitoring paging information in the entire Active Time 801, if there is no paging information to be sent during the Active Time 801.

To do this the operation shown in FIG. 8b may be utilized in which the network transmits a WUS/GTS before the Active Time 801, for example during the TAU or RRC_CONNECTED period. This operation would be similar to the operation as described in FIGS. 4b and 4c for the network node and FIGS. 6b and 6c for the wireless terminal device.

Because the Active Time in PSM occurs immediately after a connected period, in some embodiments it may not be necessary to introduce a new separate WUS/GTS signal since the wireless device will always be in a connected mode just before the Active Time. Thus any signal may be transmitted during the connected state, comprising an indication that no paging information will be sent to the wireless device during the active time and that the wireless device may operate in a sleep state for the duration of the active time.

FIG. 8c illustrates an example of operation of a wireless terminal device. The wireless terminal device may receive, during a first time window a signal from a network node operable in the wireless communications network. In this example, the first time window may be either the TAU period 800 or an uplink transmission period 802.

The signal comprises either an indication that at least one of a plurality of paging occasions will be used for the transmission of paging information; or an indication that none of the plurality of paging occasions will be used for the transmission of paging information.

For the example where the first time window is a TAU period 800, the signal may be a response to the UE requesting an Active Time (timer T3324).

In particular, where the signal is an indication that at least one of a plurality of paging occasions will be used for the transmission of paging information the signal may, instead of a dedicated WUS, be a signal setting the Active Time (T3324) to a non-zero value such that the wireless device will operate in a first mode during the second time window during which paging occasions are scheduled, where the first mode is a mode in which the wireless terminal device is able to receive paging messages from the wireless communications network.

Where the signal is an indication that none of the plurality of paging occasions will be used for the transmission of paging information, the signal may be a signal setting the Active Time (T3324) to zero such that the wireless device will operate in a second mode during a second time window during which paging occasions are scheduled. That is, if there is no paging for the wireless terminal device scheduled for during the normal Active Time, the network can dynamically set the Active Time T3324 to zero. The second mode may in some examples be the sub power efficient sub-state to RRC_IDLE in which all Access Stratum functionality is switched off (almost power-off but no re-attach needed).

Figure 9:
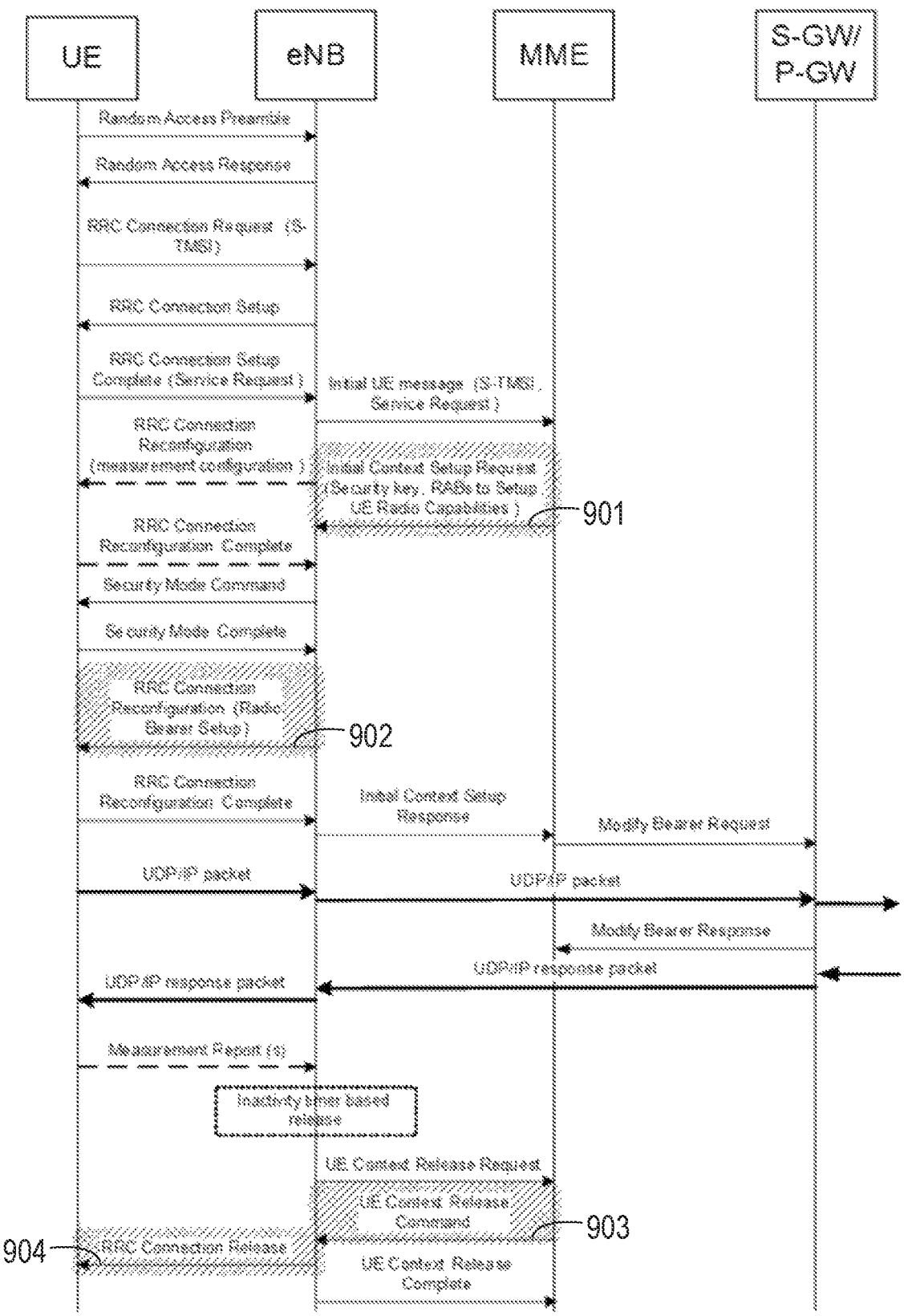
FIG. 9 illustrates an example of RRC Connection Establishment signaling.

In some embodiments, the first time window is an RRC_CONNECTED time window, for example when the wireless terminal device is sending uplink messages to the network. In these examples, the signal may be attached to the existing Access Stratum signaling for an RRC Connection Establishment. FIG. 9 illustrates an example of RRC Connection Establishment signaling as will be appreciated by a person skilled in the art.

In some embodiments, the network could assign a new value of the Active Time to the UE in the 'Initial Context Setup Request' (MME→eNB) and 'RRC Connection Reconfiguration' (eNB→UE) as indicated by the shaded messages 901 and 902 in FIG. 9. In some embodiments, the network could assign a new value of the Active Time T3324 to the UE in the 'UE Context Release Command' (MME→eNB) and 'RRC Connection Release' (eNB→UE) as indicated by the shaded messages 903 and 904 in FIG. 9. In these embodiments therefore, there is no requirement for a separate WUS/GTS. The signals 902 or 904, or any other Access Stratum (AS) signal which may be used, would therefore comprise either: an indication that at least one of a plurality of paging occasions will be used for the transmission of paging information; or an indication that none of the plurality of paging occasions will be used for the transmission of paging information by setting the Active Time to a non-zero value or zero respectively.

In other words, the Active Time could be set to zero with new Non-Access Stratum (NAS) signaling appended to the existing messages as exemplified above.

In the method as described in FIG. 7 the wireless terminal device may therefore be configured to, in response to the signal comprising an indication that none of the plurality of paging occasions will be used for the transmission of paging information, set an active time of the wireless terminal device to zero.

The wireless device may also be configured to, in response to the signal comprising an indication that at last one of the plurality of paging occasions will be used for the transmission of paging information, set an active time of the wireless terminal device to a non-zero value.

The active time may be a third time window during which the wireless terminal device remains in a RRC_IDLE mode after being in a RRC_CONNECTED mode.

In the method as described in FIG. 5, the network node may be configured to indicate in the signal, an active time of the wireless terminal device, wherein the active time is a third time window during which the wireless terminal device is configured to remain in a first mode, for example RRC_IDLE after being in a connected mode, for example RRC_CONNECTED. For example, in response to determining that no paging information is to be sent to the wireless terminal device in the second time window, the network node may be configured to set the active time of the wireless terminal device to zero. In response to determining that at least some paging information is to be sent to the wireless terminal device in the second time window, the network node may be configured to set the active time of the wireless terminal device to a non-zero value.

The embodiments described above have focused on the use of a signal, such as WUS or GTS signal, transmitted by a network node to indicate to a wireless terminal device that the wireless terminal device should monitor a subsequent paging occasion, or monitor a second time period comprising a plurality of paging occasions. In further embodiments, however, the wireless terminal device may not require any indication from the network node to determine whether to operate in a first mode or a second mode during a second time window.

For example, the network node may send a paging message to the wireless terminal device if there is a pending downlink data transmission. However, in the case in which the Active Time is preceded by an uplink transmission from the wireless terminal device to the network (i.e. as shown in the uplink transmission 802 of FIG. 8c) any data could have already been transmitted during the RRC_CONNECTED session and there may not therefore be any paging during the following Active Time. In these cases therefore, the Active Time may be set to zero to reduce power consumption of the wireless terminal device. In other words, the wireless terminal device may determine whether to operate in a first mode or mode or a second mode for a second time period based on whether any uplink messages are transmitted by the wireless terminal device during a first time period.

In yet another alternative solution, the UE may not receive an explicit 73324 Active Time value upon uplink data transmission but the T3324 Active Time value is instead set implicitly. For example, a rule could apply that wireless terminal devices may always apply a certain Active Time value after uplink data transmission. This value may either be hard coded in the specification (e.g. zero) or could be semi-statically configured in System Information broadcast by the network node. The enabling and disabling of this implicit value could also be indicated in System Information, or a indicated in dedicated signaling (e.g. RRC) during the connection.

Figure 10:
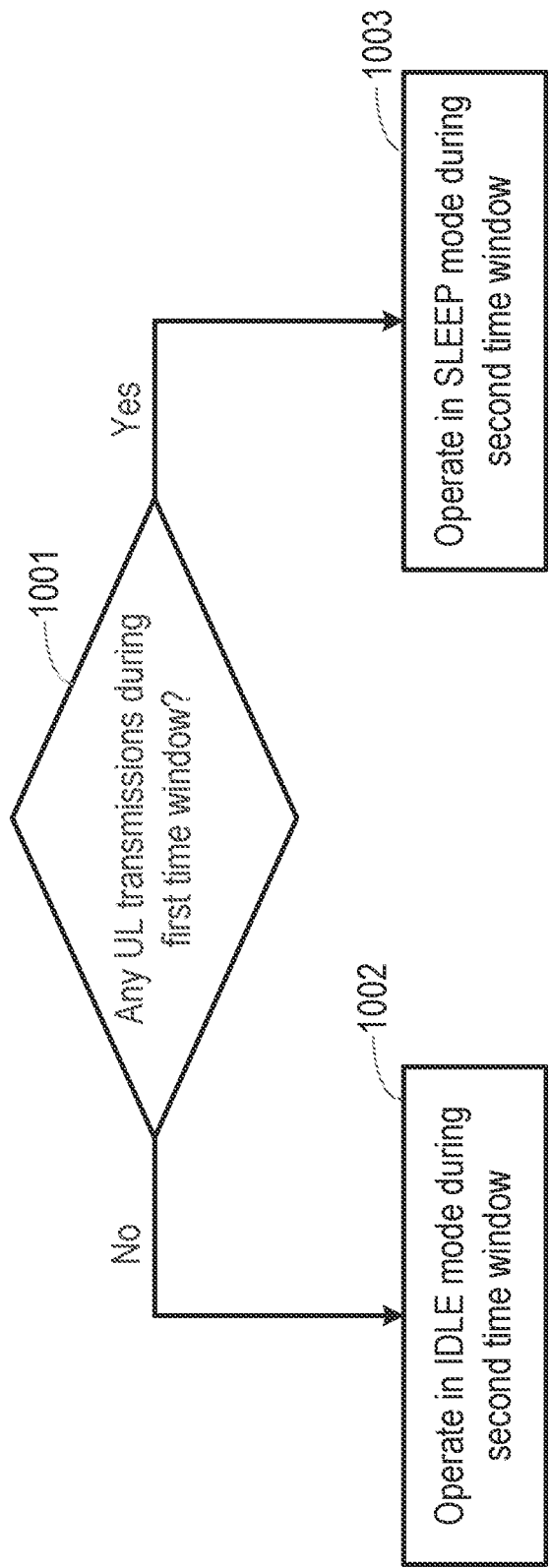
FIG. 10 illustrates a method in a wireless terminal device according to some embodiments.

FIG. 10 illustrates a method in a wireless terminal device according to such embodiments. The wireless terminal may therefore in step 1001 determine if any uplink transmissions occurred during a first time window.

If it is determined that uplink transmissions have not occurred in the first time window the method passes to step 1002 in which the wireless terminal device operates in a first mode for the duration of the second time window, in which the wireless terminal device is able is receive paging messages from the wireless communications network. For example the first mode may be RRC_IDLE.

If it is determined that uplink transmissions have occurred in the first time window the method passes to step 1003 in which the wireless terminal device operates in a sleep mode during the second time window. For example the sleep mode may be the power efficient sub state to RRC_IDLE.

As an alternative solution the active time may be assigned to the wireless device by multiplexing the active time into a Non-Access Stratum Protocol Data Unit (PDU), for example in Msg4. As described above, the Active Time may be set to zero.

Figure 11:
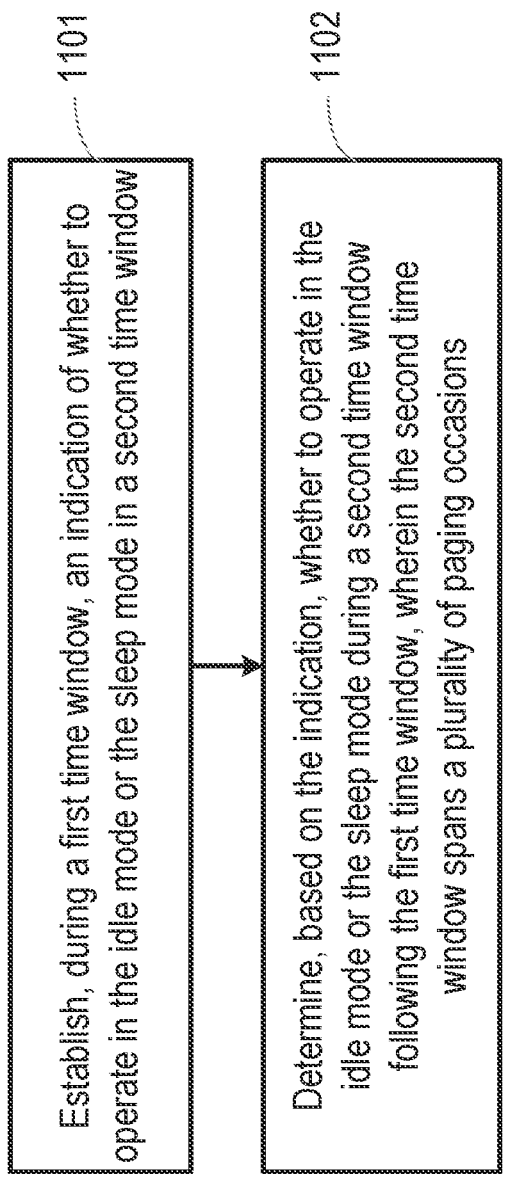
FIG. 11 illustrates a method in a wireless terminal device according to some embodiments.

FIG. 11 illustrates a method in a wireless terminal device according to some embodiments. The wireless terminal device is operable in a plurality of modes comprising a first mode, in which the wireless terminal device is able to receive paging messages from a wireless communications network, and a second mode in which the wireless terminal device is unable to receive paging messages from the wireless communications network. The second mode may be a sleep mode.

In step 1101 the method comprises establishing, during a first time window, an indication of whether to operate in the first mode or the second mode in a second time window.

As described previously, the first time window may comprise any suitable time window for example, a synchronization time window or a TAU time window or an RRC_CONNECTED time window. The indication of whether to operate in the first mode or the second mode in a second time window may be established either by receiving a signal from the network, or by inferring the indication from the lack of such a signal. Alternatively, the indication may be established due to uplink transmissions occurring during the first time window.

The second time window may be any time window in which paging occasions are defined.

In step 1102 the method comprises determining, based on the indication, whether to operate in the first mode or the second mode for the duration of the second time window, wherein the second time window spans a plurality of paging occasions.

Figure 12:
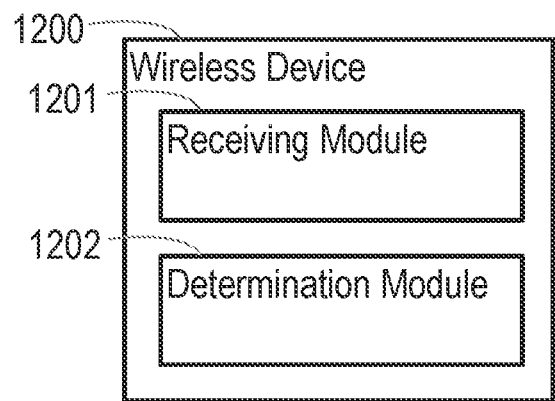
FIG. 12 illustrates a wireless device 1200 according to some embodiments.

FIG. 12 illustrates a wireless terminal device 1200 according to some embodiments. The wireless terminal device 1200 comprises a receiving module 1201 configured to receive, during a first time window, a signal from a network node operable in the wireless communications network. The signal comprises either an indication that at least one of a plurality of paging occasions will be used for the transmission of paging information; or an indication that none of the plurality of paging occasions will be used for the transmission of paging information; wherein the plurality of paging occasions are defined for the purposes of receiving paging information from the wireless communications network during a second time window. The wireless device 1200 also comprises a determination module 1202 configured to, responsive to a determination that the signal comprises an indication that none of the plurality of paging occasions will be used for the transmission of paging in information, operate in the second mode for the duration of the second time window.

Figure 13:
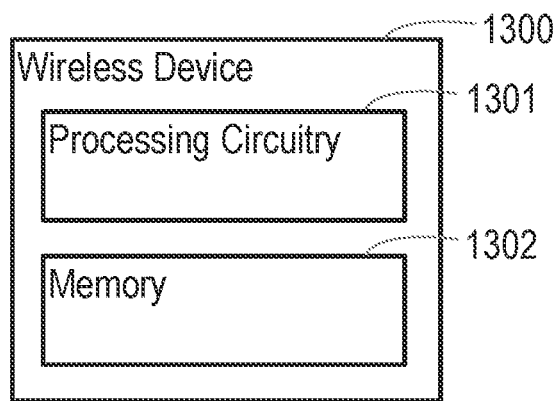
FIG. 13 illustrates a wireless device 1300 according to some embodiments.

FIG. 13 illustrates a wireless terminal device 1330 according to some embodiments. The wireless terminal device 1300 comprises processing circuitry 1301 and a machine-readable medium 1302 storing instructions which, when executed by the processing circuitry 1301, cause the terminal device 1300 to: receive, during a first time window, a signal from a network node operable in the wireless communications network. The signal comprises either: an indication that at least one of a plurality of paging occasions will be used for the transmission of paging information; or an indication that none of the plurality of paging occasions will be used for the transmission of paging information. The plurality of paging occasions are defined for the purposes of receiving paging information from the wireless communications network during a second time window. Responsive to a determination that the signal comprises an indication that none of the plurality of paging occasions will be used for the transmission of paging information, the processing circuitry 1301 causes the wireless terminal device 1300 to operate in the second mode for the duration of the second time window.

Figure 14:
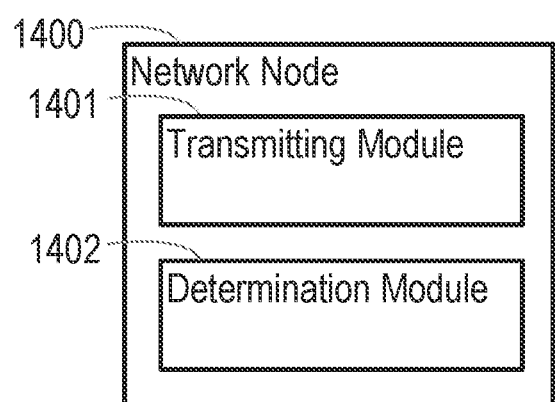
FIG. 14 illustrates a network node 1400 according to some embodiments.

FIG. 14 illustrates a network node 1400 according to some embodiments. The network node 1400 comprises a determination module 1402 configured to determine whether any paging information is to be sent to the wireless terminal device in a second time window, wherein a plurality of paging occasions are defined for the purposes of receiving paging information from the wireless communications network during the second time window; and a transmitting module 1401 configured to, based on the determination, send a signal during a first time window. The signal comprises either: an indication that at least one of a plurality of paging occasions will be used for the transmission of paging information; or an indication that none of the plurality of paging occasions will be used for the transmission of paging information.

Figure 15:
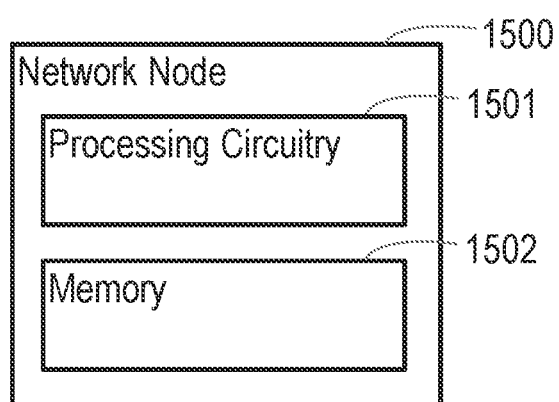
FIG. 15 illustrates a network node 1500 according to some embodiments.

FIG. 15 illustrates a network node 1500 according to some embodiments. The network node 1500 comprises processing circuitry 1501 and a machine-readable medium 1502 storing instructions which, when executed by the processing circuitry 1501, cause the network node to determine whether any paging information is to be sent to the wireless terminal device in a second time window, wherein a plurality of paging occasions are defined for the purposes of receiving paging information from the wireless communications network during the second time window; and based on the determination, send a signal during a first time window. The signal comprises either an indication that at least one of a plurality of paging occasions will be used for the transmission of paging information; or an indication that none of the plurality of paging occasions will be used for the transmission of paging information.

Figure 16:
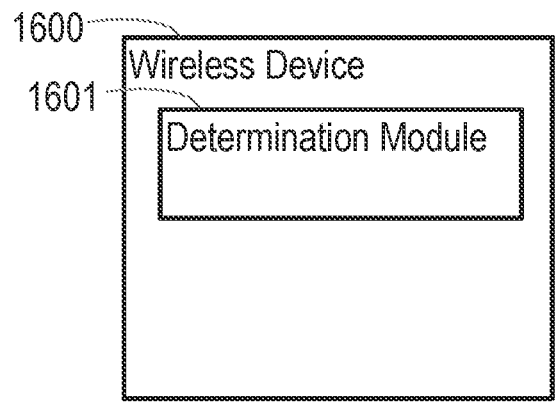
FIG. 16 illustrates a wireless terminal device 1600 according to some embodiments.

FIG. 16 illustrates a wireless terminal device 1600 according to some embodiments. The wireless terminal device 1600 comprises a determination module 1601 configured to determine whether to operate in the first mode or the second mode for a second time period based on whether any uplink messages are transmitted by the wireless terminal device during a first time period.

Figure 17:
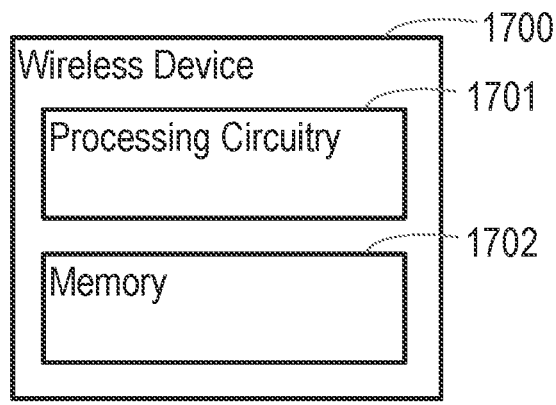
FIG. 17 illustrates a wireless terminal device 1700 according to some embodiments.

FIG. 17 illustrates a wireless terminal device 1700 according to some embodiments. The wireless terminal device 1700 comprises processing circuitry 1701 and a machine-readable medium 1702 storing instructions which, when executed by the processing circuitry, cause the wireless terminal device 1700 to determine whether to operate in the first mode or the second mode for a second time period based on whether any uplink messages are transmitted by the wireless terminal device during a first time period.

Figure 18:
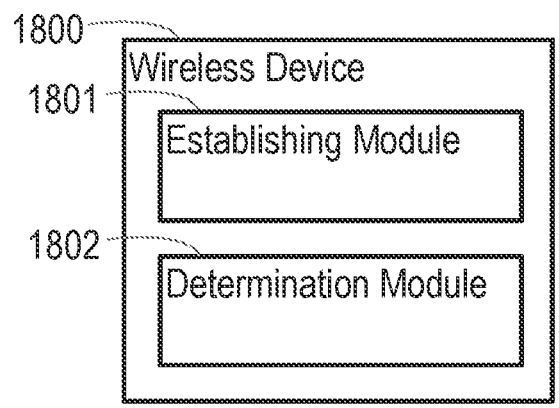
FIG. 18 illustrates a wireless terminal device 1800 according to some embodiments.

FIG. 18 illustrates a wireless terminal device 1800 according to some embodiments.

The wireless terminal device comprising a establishing module 1801 configured to establish, during a first time window, an indication of whether to operate in the first mode or the second mode in a second time window; and a determination module 1802 configured to determine, based on the indication, whether to operate in the first mode or the second mode for the duration of the second time window, wherein the second time window spans a plurality of paging occasions.

Figure 19:
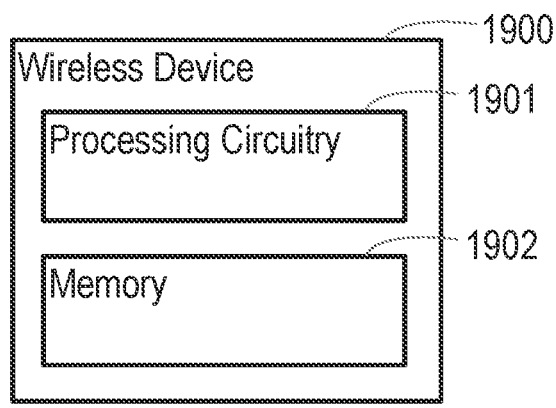
FIG. 19 illustrates a wireless terminal device 1900 according to some embodiments.

FIG. 19 illustrates a wireless terminal device 1900 according to some embodiments. The wireless terminal device 1900 comprises processing circuitry 1901 and a machine-readable medium 1902 storing instructions which, when executed by the processing circuitry, cause the wireless terminal device 1900 to establish, during a first time window, an indication of whether to operate in the first mode or the second mode in a second time window; and determine, based on the indication, whether to operate in the first mode or the second mode for the duration of the second time window, wherein the second time window spans a plurality of paging occasions.

The wireless terminal device and network node as described above may also generally comprise interface circuitry (e.g. hardware, either fixed or programmatically configured via software execution) for transmitting and receiving wireless signals, such as one or more antennas, and transceiver circuitry coupled to the one or more antennas.

There are therefore provided methods and apparatus relating to paging in a wireless communications network. In particular the disclosed methods and apparatus allow a wireless terminal device to save power by remaining asleep for longer periods of time when no paging information is to be transmitted to it.

It should be noted that the above-mentioned embodiments illustrate rather than limit the concepts disclosed herein, and that those skilled in the art will be able to design many alternative embodiments without departing from the scope of the appended following statements. The word "comprising" does not exclude the presence of elements or steps other than those listed in a statement, "a" or "an" does not exclude a plurality, and a single processor or other unit may fulfil the functions of several units recited in the statements. Any reference signs in the statements shall not be construed so as to limit their scope.

The following paragraphs set out embodiments of the disclosure:

1. A method in a wireless terminal device for a wireless communications network, the wireless terminal device being operable in a plurality of modes comprising a first mode, in which the wireless terminal device is able to receive paging messages from the wireless communications network, and a second mode in which the wireless terminal device is unable to receive paging messages from the wireless communications network, the method comprising:
   receiving, during a first time window, a signal from a network node operable in the wireless communications network, wherein the signal comprises one of:
   an indication that at least one of a plurality of paging occasions will be used for the transmission of paging information; and
   an indication that none of the plurality of paging occasions will be used for the transmission of paging information;
   wherein the plurality of paging occasions are defined for the purposes of receiving paging information from the wireless communications network during a second time window; and
   responsive to a determination that the signal comprises an indication that none of the plurality of paging occasions will be used for the transmission of paging information, operating in the second mode for the duration of the second time window.

2. A method according to paragraph 1 wherein the signal comprises an indication that none of the plurality of paging occasions will be used for the transmission of paging information.

3. A method according to paragraph 2 wherein the signal comprises a go to sleep signal.

4. A method according to paragraph 2 or 3 further comprising, responsive to a determination that the signal is received during the first time window, operating in the second mode during the second time window.

5. A method according to any one of paragraphs 2 to 4 further comprising, responsive to the signal not being received during the first time window operating in the first mode during the second time window.

6. A method according to paragraph 1 wherein the signal comprises an indication that at least one of a plurality of paging occasions will be used for the transmission of paging information.

7. A method according to paragraph 6 wherein the signal comprises a wakeup signal.

8. A method according to paragraph 6 or 7 further comprising, responsive to the signal being received in the first time window, operating in the first mode during the second time window.

9. A method according to any one of paragraphs 6 to 8 further comprising, responsive to the signal not being received, operating in the second mode during the second time window.

10. A method according to any one of the preceding paragraphs further comprising operating in the first mode during the first time window.

11. A method according to any one of the preceding paragraphs wherein the first time window is a time window in which timing and/or frequency synchronization information is exchanged between the wireless terminal device and the wireless communications network.

12. A method according to any one of the preceding paragraphs wherein the first mode is a radio resource control idle, RRC_IDLE, mode.

13. A method according to any one of the preceding paragraphs wherein the wireless terminal device is operable in extended discontinuous reception, eDRX.

14. A method according to paragraph 13 wherein the second time window comprises a paging time window, PTW.

15. A method according to any one of the preceding paragraphs wherein the signal comprises a 1-bit signal.

16. A method according to paragraph 1 further comprising operating in a connected mode during the first time window.

17. A method according to paragraph 16 wherein the connected mode is radio resource control connected, RRC_CONNECTED, mode.

18. A method according to any one of the preceding paragraphs wherein the signal is a non-access stratum signal.

19. A method according to any one of paragraphs 16 to 18 further comprising, in response to the signal comprising an indication that none of the plurality of paging occasions will be used for the transmission of paging information,
   setting an active time of the wireless terminal device to zero, wherein the active time is a third time window during which the wireless terminal device is configured to remain in the first mode after being in a connected mode.

20. A method according to any one of paragraphs 16 to 19 further comprising, in response to the signal comprising an indication that at least one of the plurality of paging occasions will be used for the transmission of paging information, setting an active time of the wireless terminal device to a non-zero value, wherein the active time is a third time window during which the wireless terminal device remains in the first mode after being in a connected mode.

21. A method according to any one of the preceding paragraphs wherein the first time window is prior to the second time window.

22. A method according to any one of paragraphs 16 to 21 wherein the first time window comprises a Tracking Area Update, TAU, in which the wireless terminal device and the network exchange information regarding an area in which the wireless terminal device is operating.

23. A method according to paragraph 22 wherein the signal comprises an RRC Connection Reconfiguration message.

24. A method according to paragraph 22 wherein the signal comprises an RRC Connection Release message.

25. A method in a network node for a communications network operable to communicate with a wireless terminal device being operable in a plurality of modes comprising a first mode, in which the wireless terminal device is able to receive paging messages from the wireless communications network, and a second mode in which the wireless terminal device is unable to receive paging messages from the wireless communications network, the method comprising:
  determining whether any paging information is to be sent to the wireless terminal device in a second time window, wherein a plurality of paging occasions are defined for the purposes of receiving paging information from the wireless communications network during the second time window; and
  based on the determination, sending a signal during a first time window wherein the signal comprises one of:
    an indication that at least one of a plurality of paging occasions will be used for the transmission of paging information; and an indication that none of the plurality of paging occasions will be used for the transmission of paging information.

26. A method according to paragraph 25 wherein the signal comprises an indication that none of the plurality of paging occasions will be used for the transmission of paging information.

27. A method according to paragraph 26 wherein the signal comprises a go to sleep signal.

28. A method according to paragraph 26 or 27 wherein, in response to determining that no paging information is to be sent to the wireless terminal device in a second time window the method comprises sending the signal.

29. A method according to any one of paragraphs 26 to 28 wherein, in response to determining that at least some paging information is to be sent to the wireless terminal device in a second time window, the method comprises not sending the signal.

30. A method according to paragraph 25 wherein the signal comprises an indication that at least one of a plurality of paging occasions will be used for the transmission of paging information.

31. A method according to paragraph 30 wherein the signal comprises a wakeup signal 32. A method according to any one of paragraphs 30 or 31, wherein, in response to determining that at least some paging information is to be sent to the wireless terminal device in the second time window, the method comprises sending the signal.

33. A method according to any one of paragraphs 30 to 32, wherein, in response to determining that no paging information is to be sent to the wireless terminal device in the second time window, the method comprises not sending the signal.

34. A method according to any one of paragraphs 25 to 33 wherein the first window is a time window in which timing and/or frequency synchronization information is exchanged between the wireless terminal device and the wireless communications network.

35. A method according to any one of paragraphs 25 to 34 wherein the second time window comprises a paging time window, PTW.

36. A method according to any one of paragraphs 25 to 35 wherein the signal comprises a 1-bit signal.

37. A method according to any one of paragraphs 25 to 36 wherein the signal is a non-access stratum signal.

38. A method according to any one of paragraphs 25 to 37 wherein the further comprises:
  indicating, in the signal, an active time of the wireless terminal device, wherein the active time is a third time window during which the wireless terminal device is configured to remain in the first mode after being in a connected mode.

39. A method according to paragraph 38 further comprising:
  in response to determining that no paging information is to be sent to the wireless terminal device in the second time window, setting the active time of the wireless terminal device to zero.

40. A method according to any one of paragraphs 38 or 39 further comprising:
  in response to determining that at least some paging information is to be sent to the wireless terminal device in the second time window, setting the active time of the wireless terminal device to a non-zero value.

41. A method according to any one of paragraphs 25 to 40 wherein the first time window is prior to the second time window.

42. A method in a wireless terminal device for a wireless communications network, the wireless terminal device being operable in a plurality of modes comprising a first mode, in which the wireless terminal device is able to receive paging messages from the wireless communications network, and a second mode in which the wireless terminal device is unable to receive paging messages from the wireless communications network, the method comprising: determining whether to operate in the first mode or the second mode for a second time period based on whether any uplink messages are transmitted by the wireless terminal device during a first time period.

43. A method according to paragraph 42 wherein if uplink transmissions occurred during the first time window, the step of determining comprises determining to operate in the second mode during the second time window.

44. A method according to paragraph 42 or 43 wherein the wireless terminal device is operating in a connected mode during the first time period.

45. A method for a wireless terminal device in a wireless communications network, the wireless terminal device being operable in a plurality of modes comprising a first mode, in which the wireless terminal device is able to receive paging messages from the wireless communications network, and a second mode in which the wireless terminal device is unable to receive paging messages from the wireless communications network, the method comprising:
  establishing, during a first time window, an indication of whether to operate in the first mode or the second mode in a second time window; and determining, based on the indication, whether to operate in the first mode or the second mode for the duration of the second time window, wherein the second time window spans a plurality of paging occasions.

46. A wireless terminal device in a wireless communications network, the wireless terminal device being operable in a plurality of modes comprising a first mode, in which the wireless terminal device is able to receive paging messages from the wireless communications network, and a second mode in which the wireless terminal device is unable to receive paging messages from the wireless communications network, the wireless terminal device comprising:
- a receiving module configured to receive, during a first time window, a signal from a network node operable in the wireless communications network, wherein the signal comprises one of:
- an indication that at least one of a plurality of paging occasions will be used for the transmission of paging information; and
- an indication that none of the plurality of paging occasions will be used for the transmission of paging information;
- wherein the plurality of paging occasions are defined for the purposes of receiving paging information from the wireless communications network during a second time window; and
- a determination module configured to, responsive to a determination that the signal comprises an indication that none of the plurality of paging occasions will be used for the transmission of paging information, operate in the second mode for the duration of the second time window.

47. A wireless terminal device according to paragraph 46 wherein the signal comprises an indication that none of the plurality of paging occasions will be used for the transmission of paging information.

48. A wireless terminal device according to paragraph 47 wherein the signal comprises a go to sleep signal.

49. A wireless terminal device according to paragraph 47 or 48 wherein the determination module is further configured to, responsive to a determination that the signal is received during the first time window, operate in the second mode during the second time window.

50. A wireless terminal device according to any one of paragraphs 47 to 49 wherein the determination module is further configured to, responsive to the signal not being received during the first time window operate in the first mode during the second time window.

51. A wireless terminal device according to paragraph 46 wherein the signal comprises an indication that at least one of a plurality of paging occasions will be used for the transmission of paging information.

52. A wireless terminal device according to paragraph 51 wherein the signal comprises a wakeup signal.

53. A wireless terminal device according to paragraph 51 or 52, wherein the determination module is further configured to, responsive to the signal being received in the first time window, operate in the first mode during the second time window.

54. A wireless terminal device according to any one of paragraphs 51 to 53, wherein the determination module is further configured to, responsive to the signal not being received, operate in the second mode during the second time window.

55. A wireless terminal device according to any one of paragraphs 46 to 54 wherein the determination module is further configured to, operate in the first mode during the first time window.

56. A wireless terminal device according to any one of paragraphs 46 to 55 wherein the first time window is a time window in which timing and/or frequency synchronization information is exchanged between the wireless terminal device and the wireless communications network.

57. A wireless terminal device according to any one of paragraphs 46 to 56 wherein the first mode is a radio resource control idle, RRC_IDLE, mode.

58. A wireless terminal device according to any one of paragraphs 46 to 57 wherein the wireless terminal device is operable in extended discontinuous reception, eDRX.

59. A wireless terminal device according to paragraph 58 wherein the second time window comprises a paging time window, PTW.

60. A wireless terminal device according to any one of paragraphs 46 to 59 wherein the signal comprises a 1-bit signal.

61. A method according to paragraph 46 wherein the determination module is further configured to, operate in a connected mode during the first time window.

62. A wireless terminal device according to paragraph 61 wherein the connected mode is radio resource control connected, RRC_CONNECTED, mode.

63. A wireless terminal device according to any one of paragraphs 46 to 62 wherein the signal is a non-access stratum signal.

64. A wireless terminal device according to any one of paragraphs 61 to 63 wherein the determination module is further configured to, in response to the signal comprising an indication that none of the plurality of paging occasions will be used for the transmission of paging information,
- set an active time of the wireless terminal device to zero, wherein the active time is a third time window during which the wireless terminal device is configured to remain in the first mode after being in a connected mode.

65. A wireless terminal device according to any one of paragraphs 61 to 64 wherein the determination module is further configured to, in response to the signal comprising an indication that at least one of the plurality of paging occasions will be used for the transmission of paging information,
- set an active time of the wireless terminal device to a non-zero value, wherein the active time is a third time window during which the wireless terminal device remains in the first mode after being in a connected mode.

66. A wireless terminal device according to any one of the paragraphs 46 to 65 wherein the first time window is prior to the second time window.

67. A wireless terminal device according to any one of paragraphs 61 to 66 wherein the first time window comprises a Tracking Area Update, TAU, in which the wireless terminal device and the network exchange information regarding an area in which the wireless terminal device is operating.

68. A wireless terminal device according to paragraph 67 wherein the signal comprises an RRC Connection Reconfiguration message.

69. A wireless terminal device according to paragraph 67 wherein the signal comprises an RRC Connection Release message.

70. A network node for a communications network operable to communicate with a wireless terminal device being operable in a plurality of modes comprising a first mode, in which the wireless terminal device is able to receive paging messages from the wireless communications network, and a second mode in which the wireless terminal device is unable to receive paging messages from the wireless communications network, the network node comprising:
  a determination module configured to determine whether any paging information is to be sent to the wireless terminal device in a second time window, wherein a plurality of paging occasions are defined for the purposes of receiving paging information from the wireless communications network during the second time window; and a transmitting module configured to, based on the determination, send a signal during a first time window wherein the signal comprises one of:
  an indication that at least one of a plurality of paging occasions will be used for the transmission of paging information; and an indication that none of the plurality of paging occasions will be used for the transmission of paging information.

71. A network node according to paragraph 70 wherein the signal comprises an indication that none of the plurality of paging occasions will be used for the transmission of paging information.

72. A network node according to paragraph 71 wherein the signal comprises a go to sleep signal.

73. A network node according to paragraph 71 or 72 wherein, in response to a determination that no paging information is to be sent to the wireless terminal device in a second time window, the transmitting module if configured to send the signal.

74. A network node according to any one of paragraphs 71 to 73 wherein, in response to a determination that at least some paging information is to be sent to the wireless terminal device in a second time window, the transmitting module is configured to not send the signal.

75. A network node according to paragraph 70 wherein the signal comprises an indication that at least one of a plurality of paging occasions will be used for the transmission of paging information.

76. A network node according to paragraph 75 wherein the signal comprises a wakeup signal 77. A network node according to any one of paragraphs 75 or 76, wherein, in response to a determination that at least some paging information is to be sent to the wireless terminal device in the second time window, the transmitting module is configured to send the signal.

78. A network node according to any one of paragraphs 75 to 77, wherein, in response to a determination that no paging information is to be sent to the wireless terminal device in the second time window, the transmitting module is configured to not send the signal.

79. A network node according to any one of paragraphs 70 to 78 wherein the first time window is a time window in which timing and/or frequency synchronization information is exchanged between the wireless terminal device and the wireless communications network.

80. A network node according to any one of paragraphs 70 to 79 wherein the second time window comprises a paging time window, PTW.

81. A network node according to any one of paragraphs 70 to 80 wherein the signal comprises a 1-bit signal.

82. A network node according to any one of paragraphs 70 to 81 wherein the signal is a non-access stratum signal.

83. A network node according to any one of paragraphs 70 to 82 wherein the transmitting module is further configured to: indicate, in the signal, an active time of the wireless terminal device, wherein the active time is a third time window during which the wireless terminal device is configured to remain in the first mode after being in a connected mode.

84. A network node according to paragraph 83 further comprising:
  in response to a determination that no paging information is to be sent to the wireless terminal device in the second time window, the transmitting module is configured to set the active time of the wireless terminal device to zero.

85. A network node according to any one of paragraphs 83 or 84 further comprising:
  in response to a determination that at least some paging information is to be sent to the wireless terminal device in the second time window, the transmitting module is configured to set the active time of the wireless terminal device to a non-zero value.

86. A network node according to any one of paragraphs 70 to 85 wherein the first time window is prior to the second time window.

87. A wireless terminal device for a wireless communications network, the wireless terminal device being operable in a plurality of modes comprising a first mode, in which the wireless terminal device is able to receive paging messages from the wireless communications network, and a second mode in which the wireless terminal device is unable to receive paging messages from the wireless communications network, the wireless terminal device comprising:
  a determination module configured to determine whether to operate in the first mode or the second mode for a second time period based on whether any uplink messages are transmitted by the wireless terminal device during a first time period.

88. A wireless terminal device according to paragraph 87 wherein if uplink transmissions occurred during the first time window, the determination module is configured to determine to operate in the second mode during the second time window.

89. A wireless terminal device according to paragraph 87 or 89 wherein the wireless terminal device is configured to operate in a connected mode during the first time period.

90. A wireless terminal device in a wireless communications network, the wireless terminal device being operable in a plurality of modes comprising a first mode, in which the wireless terminal device is able to receive paging messages from the wireless communications network, and a second mode in which the wireless terminal device is unable to receive paging messages from the wireless communications network, the wireless terminal device comprising:
  an establishing module configured to establish, during a first time window, an indication of whether to operate in the first mode or the second mode in a second time window; and
  a determination module configured to determine, based on the indication, whether to operate in the first mode or the second mode for the duration of the second time window, wherein the second time window spans a plurality of paging occasions.

91. A wireless terminal device in a wireless communications network, the wireless terminal device being operable in a plurality of modes comprising a first mode, in which the wireless terminal device is able to receive paging messages from the wireless communications network, and a second mode in which the wireless terminal device is unable to receive paging messages from the wireless communications network, the wireless terminal device comprising: processing circuitry and a machine-readable medium storing instructions which, when executed by the processing circuitry, cause the terminal device to:
  receive, during a first time window, a signal from a network node operable in the wireless communications network, wherein the signal comprises one of:
  an indication that at least one of a plurality of paging occasions will be used for the transmission of paging information; and
  an indication that none of the plurality of paging occasions will be used for the transmission of paging information;
  wherein the plurality of paging occasions are defined for the purposes of receiving paging information from the wireless communications network during a second time window; and
  responsive to a determination that the signal comprises an indication that none of the plurality of paging occasions will be used for the transmission of paging information, operate in the second mode for the duration of the second time window.

92. A network node for a communications network operable to communicate with a wireless terminal device being operable in a plurality of modes comprising a first mode, in which the wireless terminal device is able to receive paging messages from the wireless communications network, and a second mode in which the wireless terminal device is unable to receive paging messages from the wireless communications network, the network node comprising:
  processing circuitry and a machine-readable medium storing instructions which, when executed by the processing circuitry, cause the network node to:
  determine whether any paging information is to be sent to the wireless terminal device in a second time window, wherein a plurality of paging occasions are defined for the purposes of receiving paging information from the wireless communications network during the second time window; and
  based on the determination, send a signal during a first time window wherein the signal comprises one of:
  an indication that at least one of a plurality of paging occasions will be used for the transmission of paging information; and an indication that none of the plurality of paging occasions will be used for the transmission of paging information.

93. A wireless terminal device for a wireless communications network, the wireless terminal device being operable in a plurality of modes comprising a first mode, in which the wireless terminal device is able to receive paging messages from the wireless communications network, and a second mode in which the wireless terminal device is unable to receive paging messages from the wireless communications network, the wireless terminal device comprising: processing circuitry and a machine-readable medium storing instructions which, when executed by the processing circuitry, cause the terminal device to:
  determine whether to operate in the first mode or the second mode for a second time period based on whether any uplink messages are transmitted by the wireless terminal device during a first time period.

94. A wireless terminal device in a wireless communications network, the wireless terminal device being operable in a plurality of modes comprising a first mode, in which the wireless terminal device is able to receive paging messages from the wireless communications network, and a second mode in which the wireless terminal device is unable to receive paging messages from the wireless communications network, the wireless terminal device comprising: processing circuitry and a machine-readable medium storing instructions which, when executed by the processing circuitry, cause the terminal device to:
  establish, during a first time window, an indication of whether to operate in the first mode or the second mode in a second time window; and
  determine, based on the indication, whether to operate in the first mode or the second mode for the duration of the second time window, wherein the second time window spans a plurality of paging occasions.

95. A wireless terminal device configured to perform a method according to any one of paragraphs 1 to 24 and 42 to 45.

96. A network node configured to perform a method according to any one of paragraphs 25 to 41.

What is claimed is:

1. A method performed by a wireless terminal device with respect to a wireless communication network having a plurality of cells, the method comprising:
  exiting a sleep mode and monitoring, as initial monitoring, for control signaling in advance of a paging time window; and
  deciding whether to perform further monitoring for control signaling within the paging time window in dependence on the results of the initial monitoring and whether the wireless terminal device is in a same cell with respect to last entering the sleep mode.

2. The method of claim 1, wherein the method comprises deciding to perform the further monitoring in response either to:
  the initial monitoring indicating that one or more paging occasions within the paging time window will be used for the wireless terminal device; or
  determining that the wireless terminal device is not in the same cell with respect to last entering the sleep mode.

3. The method of claim 2, further comprising, upon deciding to perform the further monitoring, performing the further monitoring by monitoring for control signaling in each of one or more paging occasions within the paging time window.

4. The method of claim 3, further comprising returning to the sleep mode between the monitoring performed with respect to each of the one or more paging occasions.

5. The method of claim 1, wherein deciding whether to perform the further monitoring comprises deciding not to perform the further monitoring in response to not receiving an initial Wake-Up Signal (WUS) during the initial monitoring, and determining that the wireless terminal device awakened in the same cell with respect to last entering the sleep mode.

6. The method of claim 1, wherein deciding whether to perform the further monitoring comprises deciding not to perform the further monitoring in response to receiving a Go-To-sleep Signal (GTS) during the initial monitoring.

7. A wireless terminal device configured to operate with respect to a wireless communication network having a plurality of cells, the wireless terminal device comprising:
  transceiver circuitry; and
  processing circuitry configured to:
  exit the wireless terminal device from a sleep mode and monitor, as initial monitoring, for control signaling in advance of a paging time window; and decide whether to perform further monitoring for control signaling within the paging time window in dependence on the results of the initial monitoring and whether the wireless terminal device is in a same cell with respect to last entering the sleep mode.

8. The wireless terminal device of claim 7, wherein the processing circuitry is configured to decide to perform the further monitoring in response either to:

the initial monitoring indicating that one or more paging occasions within the paging time window will be used for the wireless terminal device; or determining that the wireless terminal device is not in the same cell with respect to last entering the sleep mode.

9. The wireless terminal device of claim 8, wherein the processing circuitry is configured to perform the further monitoring by monitoring for control signaling in each of one or more paging occasions within the paging time window.

10. The wireless terminal device of claim 9, wherein the processing circuitry is configured to return the wireless terminal device to the sleep mode between the monitoring performed with respect to each of the one or more paging occasions.

11. The wireless terminal device of claim 7, wherein the processing circuitry is configured to decide not to perform the further monitoring in response to not receiving an initial Wake-Up Signal (WUS) during the initial monitoring, and determining that the wireless terminal device awakened in the same cell with respect to last entering the sleep mode.

12. The wireless terminal device of claim 7, wherein the processing circuitry is configured to decide not to perform the further monitoring in response to receiving a Go-To-sleep Signal (GTS) during the initial monitoring.

* * * * *

UNITED STATES PATENT AND TRADEMARK OFFICE
CERTIFICATE OF CORRECTION

PATENT NO. : 11,570,713 B2
APPLICATION NO. : 17/401433
DATED : January 31, 2023
INVENTOR(S) : Höglund et al.

It is certified that error appears in the above-identified patent and that said Letters Patent is hereby corrected as shown below:

In the Specification

In Column 1, Line 8, delete "2018," and insert -- 2018, now Pat. No. 11,129,100, --, therefor.

In Column 1, Line 43, delete "de vice" and insert -- device --, therefor.

In Column 2, Line 1, delete "It there" and insert -- If there --, therefor.

In Column 2, Line 11, delete "10 s" and insert -- 10s --, therefor.

In Column 4, Line 6, delete "time w do an" and insert -- time window, an --, therefor.

In Column 4, Line 7, delete "window and" and insert -- window; and --, therefor.

In Column 4, Line 15, delete "first node," and insert -- first mode, --, therefor.

In Column 4, Line 17, delete "network and" and insert -- network, and --, therefor.

In Column 5, Line 16, delete "how may" and insert -- how it may --, therefor.

In Column 5, Line 33, delete "with wireless" and insert -- with a wireless --, therefor.

In Column 7, Line 3, delete "laptop embedded equipped (LEE)," and insert -- laptop embedded equipment (LEE), --, therefor.

In Column 8, Line 16, delete "Wake-up signal (WUS) or Go-to-Sleep (GTS) signal" and insert -- Wake-Up Signal (WUS) or Go-To-sleep Signal (GTS) --, therefor.

In Column 8, Line 25, delete "go-to-sleep signal (GSS)," and insert -- Go-To-sleep Signal (GTS), --, therefor.

Signed and Sealed this
Nineteenth Day of September, 2023

Katherine Kelly Vidal
*Director of the United States Patent and Trademark Office*

In Column 8, Line 32, delete "GSS" and insert -- GTS --, therefor.

In Column 8, Line 33, delete "GSS" and insert -- GTS --, therefor.

In Column 8, Line 35, delete "GSS" and insert -- GTS --, therefor.

In Column 8, Line 38, delete "GSS" and insert -- GTS --, therefor.

In Column 8, Line 54, delete "WUS/GSS" and insert -- WUS/GTS --, therefor.

In Column 8, Line 59, delete "WUS/GSS" and insert -- WUS/GTS --, therefor.

In Column 8, Line 60, delete "WUS/GSS" and insert -- WUS/GTS --, therefor.

In Column 8, Line 62, delete "repeated certain" and insert -- repeated a certain --, therefor.

In Column 10, Line 16, delete "101b an" and insert -- 101b and --, therefor.

In Column 15, Line 63, delete "FIGS. 4 to 7" and insert -- FIGS. 4a to 7 --, therefor.

In Column 16, Lines 19-20, delete "FIGS. 4-7" and insert -- FIGS. 4a-7 --, therefor.

In Column 16, Line 63, delete "either an" and insert -- either: an --, therefor.

In Column 18, Line 46, delete "73324" and insert -- T3324 --, therefor.

In Column 18, Line 55, delete "or a indicated" and insert -- or is indicated --, therefor.

In Column 18, Line 65, delete "is able is receive" and insert -- is able to receive --, therefor.

In Column 19, Line 45, delete "either an" and insert -- either: an --, therefor.

In Column 19, Lines 56-57, delete "paging in information," and insert -- paging information, --, therefor.

In Column 19, Lines 59, delete "wireless terminal device 1330" and insert -- wireless terminal device 1300 --, therefor.

In Column 24, Lines 5, delete "first window" and insert -- first time window --, therefor.

In Column 30, Line 4, delete "wire less" and insert -- wireless --, therefor.